US012621585B2

(12) United States Patent
Liu et al.

(10) Patent No.: US 12,621,585 B2
(45) Date of Patent: May 5, 2026

(54) TIME DELAY INTEGRATION SENSOR WITH IN-PIXEL TIME DELAY INTEGRATION

(71) Applicants:PIXART IMAGING INC., Hsin-Chu County (TW); Taiwan Space Agency, Hsin-Chu City (TW)

(72) Inventors: Ren-Chieh Liu, Hsin-Chu County (TW); Yi-Che Yen, Hsin-Chu County (TW)

(73) Assignees: PIXART IMAGING INC., Hsin-Chu County (TW); Taiwan Space Agency, Hsin-Chu City (TW)

( * ) Notice: Subject to any disclaimer, the term of this patent is extended or adjusted under 35 U.S.C. 154(b) by 26 days.

(21) Appl. No.: 18/751,352

(22) Filed: Jun. 24, 2024

(65) Prior Publication Data

US 2025/0392842 A1　Dec. 25, 2025

(51) Int. Cl.
*H04N 25/768* (2023.01)
*H04N 25/531* (2023.01)
*H04N 25/78* (2023.01)

(52) U.S. Cl.
CPC ......... *H04N 25/768* (2023.01); *H04N 25/531* (2023.01); *H04N 25/78* (2023.01)

(58) Field of Classification Search
CPC .... H04N 25/768; H04N 25/531; H04N 25/78; H04N 25/771; H04N 25/772; H04N 5/3532
See application file for complete search history.

(56) References Cited

U.S. PATENT DOCUMENTS

| | | | | |
|---|---|---|---|---|
| 9,148,601 | B2 | 9/2015 | Fox | |
| 2009/0295971 | A1* | 12/2009 | Tsuchiya | H04N 23/689 |
| | | | | 348/311 |
| 2013/0334399 | A1* | 12/2013 | Dupont | H10F 39/813 |
| | | | | 250/208.1 |
| 2014/0184847 | A1* | 7/2014 | Fujita | H04N 23/74 |
| | | | | 348/222.1 |
| 2014/0263969 | A1* | 9/2014 | Mayer | H04N 25/711 |
| | | | | 250/208.1 |
| 2016/0150128 | A1* | 5/2016 | Shaffer | H04N 25/711 |
| | | | | 348/295 |
| 2021/0409630 | A1* | 12/2021 | Liu | H04N 25/531 |
| 2022/0224848 | A1* | 7/2022 | Liu | H04N 25/772 |

* cited by examiner

*Primary Examiner* — Nhan T Tran

(74) *Attorney, Agent, or Firm* — HAUPTMAN HAM, LLP

(57) ABSTRACT

The present disclosure provides a time delay integration (TDI) sensor to move with respect to a scene in an along-track direction. A pixel array of the TDI sensor includes multiple pixel columns each including multiple pixels arranged in the along-track direction. Each pixel column includes a first pixel and a second pixel adjacent to each other. The second pixel includes an extra transfer transistor connected between a photodiode of the second pixel and a floating diffusion node of the first pixel.

19 Claims, 22 Drawing Sheets

500

*one line time difference

| Frame No. | Frame1 | Frame2 | Frame3 | Frame4 | Frame5 | Frame6 | Frame7 | Frame8 | Frame9 | Frame10 | ⋮ | ⋮ | ⋮ |
|---|---|---|---|---|---|---|---|---|---|---|---|---|---|
| Integrator 73 | $1I_A$ | $1I_B$ | $1I_C$ | $1I_D$ | $1I_E$ | $1I_F$ | $1I_G$ | $1I_H$ | $1I_I$ | $1I_J$ | ⋮ | ⋮ | ⋮ |
| Integrator 72 | 0 | $2I_A$ | $2I_B$ | $2I_C$ | $2I_D$ | $2I_E$ | $2I_F$ | $2I_G$ | $2I_H$ | $2I_I$ | ⋮ | ⋮ | ⋮ |
| Integrator 71 | 0 | 0 | $3I_A$ | $3I_B$ | $3I_C$ | $3I_D$ | $3I_E$ | $3I_F$ | $3I_G$ | $3I_H$ | $3I_I$ | ⋮ | $3I_J$ |
| Output | | | $3I_A$ | $3I_B$ | $3I_C$ | $3I_D$ | $3I_E$ | $3I_F$ | $3I_G$ | $3I_H$ | $3I_I$ | ⋮ | $3I_J$ |

*double line time difference

| Frame No. | Frame1 | Frame2 | Frame3 | Frame4 | Frame5 | Frame6 | Frame7 | Frame8 | Frame9 | Frame10 | ⋮ | ⋮ | ⋮ |
|---|---|---|---|---|---|---|---|---|---|---|---|---|---|
| Integrator 73 | $1I_A$ | $1I_B$ | $1I_C$ | $1I_D$ | $1I_E$ | $1I_F$ | $1I_G$ | $1I_H$ | $1I_I$ | $1I_J$ | ⋮ | ⋮ | ⋮ |
| Integrator 72 | 0 | $1I_A$ | $1I_B$ | $1I_C$ | $1I_D$ | $1I_E$ | $1I_F$ | $1I_G$ | $1I_H$ | $1I_I$ | ⋮ | ⋮ | ⋮ |
| Integrator 71 | 0 | 0 | $2I_A$ | $2I_B$ | $2I_C$ | $2I_D$ | $2I_E$ | $2I_F$ | $2I_G$ | $2I_H$ | $2I_I$ | ⋮ | $2I_J$ |
| Output | | | $2I_A$ | $2I_B$ | $2I_C$ | $2I_D$ | $2I_E$ | $2I_F$ | $2I_G$ | $2I_H$ | $2I_I$ | ⋮ | $2I_J$ |

FIG. 7C

*one line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 84 | $1I_A$ | $1I_B$ | $1I_C$ | $1I_D$ | $1I_E$ | $1I_F$ | $1I_G$ | $1I_H$ | $1I_I$ | $1I_J$ | ... | ... | ... |
| Integrator 83 | 0 | $2I_A$ | $2I_B$ | $2I_C$ | $2I_D$ | $2I_E$ | $2I_F$ | $2I_G$ | $2I_H$ | $2I_I$ | ... | ... | ... |
| Integrator 82 | 0 | 0 | $3I_A$ | $3I_B$ | $3I_C$ | $3I_D$ | $3I_E$ | $3I_F$ | $3I_G$ | $3I_H$ | ... | ... | ... |
| Integrator 81 | 0 | 0 | 0 | $4I_A$ | $4I_B$ | $4I_C$ | $4I_D$ | $4I_E$ | $4I_F$ | $4I_G$ | $4I_H$ | | ... |
| Output | | | | $4I_A$ | $4I_B$ | $4I_C$ | $4I_D$ | $4I_E$ | $4I_F$ | $4I_G$ | $4I_H$ | $4I_I$ | ... |

*double line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 84 | $1I_A$ | $1I_B$ | $1I_C$ | $1I_D$ | $1I_E$ | $1I_F$ | $1I_G$ | $1I_H$ | $1I_I$ | $1I_J$ | ... | ... | ... |
| Integrator 83 | 0 | $1I_A$ | $1I_B$ | $1I_C$ | $1I_D$ | $1I_E$ | $1I_F$ | $1I_G$ | $1I_H$ | $1I_I$ | ... | ... | ... |
| Integrator 82 | 0 | 0 | $2I_A$ | $2I_B$ | $2I_C$ | $2I_D$ | $2I_E$ | $2I_F$ | $2I_G$ | $2I_H$ | ... | ... | ... |
| Integrator 81 | ○ | ○ | ○ | ○ | ○ | ○ | ○ | ○ | ○ | ○ | | | |
| Output | | | $2I_A$ | $2I_B$ | $2I_C$ | $2I_D$ | $2I_E$ | $2I_F$ | $2I_G$ | $2I_H$ | $2I_I$ | $2I_J$ | ... |

FIG. 8C

*one line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 98 | $1I_F$ | $1I_G$ | $1I_H$ | $1I_I$ | $1I_J$ | $1I_K$ | $1I_L$ | $1I_M$ | $1I_N$ | $1I_O$ | ⋮ | ⋮ | ⋮ |
| Integrator 97 | $1I_E$ | $2I_F$ | $2I_G$ | $2I_H$ | $2I_I$ | $2I_J$ | $2I_K$ | $2I_L$ | $2I_M$ | $2I_N$ | ⋮ | ⋮ | ⋮ |
| Integrator 96 | $1I_D$ | $2I_E$ | $3I_F$ | $3I_G$ | $3I_H$ | $3I_I$ | $3I_J$ | $3I_K$ | $3I_L$ | $3I_M$ | ⋮ | ⋮ | ⋮ |
| Integrator 95 | $1I_C$ | $2I_D$ | $3I_E$ | $4I_F$ | $4I_G$ | $4I_H$ | $4I_I$ | $4I_J$ | $4I_K$ | $4I_L$ | ⋮ | ⋮ | ⋮ |
| Integrator 94 | $1I_B$ | $2I_C$ | $3I_D$ | $4I_E$ | $5I_F$ | $5I_G$ | $5I_H$ | $5I_I$ | $5I_J$ | $5I_K$ | ⋮ | ⋮ | ⋮ |
| Integrator 93 | $1I_A$ | $2I_B$ | $3I_C$ | $4I_D$ | $5I_E$ | $6I_F$ | $6I_G$ | $6I_H$ | $6I_I$ | $6I_J$ | ⋮ | ⋮ | ⋮ |
| Integrator 92 | ○ | $2I_A$ | $3I_B$ | $4I_C$ | $5I_D$ | $6I_E$ | $7I_F$ | $7I_G$ | $7I_H$ | $7I_I$ | ⋮ | ⋮ | ⋮ |
| Integrator 91 | ○ | ○ | $3I_A$ | $4I_B$ | $5I_C$ | $6I_D$ | $7I_E$ | $8I_F$ | $8I_G$ | $8I_H$ | ⋮ | ⋮ | ⋮ |
| Output | | | | | | | | $8I_F$ | $8I_G$ | $8I_H$ | $8I_I$ | $8I_J$ | ⋮ |

*double line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 98 | $1I_F$ | $1I_G$ | $1I_H$ | $1I_I$ | $1I_J$ | $1I_K$ | $1I_L$ | $1I_M$ | $1I_N$ | $1I_O$ | ⋮ | ⋮ | ⋮ |
| Integrator 97 | $1I_E$ | $2I_F$ | $2I_G$ | $2I_H$ | $2I_I$ | $2I_J$ | $2I_K$ | $2I_L$ | $2I_M$ | $2I_N$ | ⋮ | ⋮ | ⋮ |
| Integrator 96 | ○ | $1I_E$ | $2I_F$ | $2I_G$ | $2I_H$ | $2I_I$ | $2I_J$ | $2I_K$ | $2I_L$ | $2I_M$ | ⋮ | ⋮ | ⋮ |
| Integrator 95 | ○ | ○ | $1I_E$ | $2I_F$ | $2I_G$ | $2I_H$ | $2I_I$ | $2I_J$ | $2I_K$ | $2I_L$ | ⋮ | ⋮ | ⋮ |
| Integrator 94 | $1I_B$ | $1I_C$ | $1I_D$ | $2I_E$ | $3I_F$ | $3I_G$ | $3I_H$ | $3I_I$ | $3I_J$ | $3I_K$ | ⋮ | ⋮ | ⋮ |
| Integrator 93 | $1I_A$ | $2I_B$ | $2I_C$ | $2I_D$ | $3I_E$ | $4I_F$ | $4I_G$ | $4I_H$ | $4I_I$ | $4I_J$ | ⋮ | ⋮ | ⋮ |
| Integrator 92 | ○ | ○ | ○ | ○ | ○ | ○ | ○ | ○ | ○ | ○ | ⋮ | ⋮ | ⋮ |
| Integrator 91 | ○ | ○ | ○ | ○ | ○ | ○ | ○ | ○ | ○ | ○ | ⋮ | ⋮ | ⋮ |
| Output | | | | | | $4I_F$ | $4I_G$ | $4I_H$ | $4I_I$ | $4I_J$ | $4I_K$ | $4I_L$ | ⋮ |

FIG. 9C

| | $C_{FD1}$ | $C_{FD2}$ |
|---|---|---|
| Transfer1 | | |
| $M_{TG12}$ OFF, $M_{TG21}$ ON | E1 | |
| $M_{TG22}$ OFF, $M_{TG31}$ ON | | D1 |
| Transfer2 | $C_{FD1}$ | $C_{FD2}$ |
| $M_{TG12}$ ON, $M_{TG21}$ OFF | E1+E2 | |
| $M_{TG22}$ ON, $M_{TG31}$ OFF | | D1+D2 |

TIME DELAY INTEGRATION SENSOR WITH IN-PIXEL TIME DELAY INTEGRATION

BACKGROUND

1. Field of the Disclosure

This disclosure generally relates to a time delay integration (TDI) sensor and, more particularly, to a TDI Complementary Metal-Oxide-Semiconductor (CMOS) image sensor that uses in-pixel TDI to reduce a time interval to read pixel data.

2. Description of the Related Art

The time delay integration (TDI) sensor uses an area array image sensor to capture images from an imaging platform that is moving relative to the imaged object or scene at a constant speed. The TDI sensor is conceptually considered as the stack of linear arrays, wherein each linear array moves across a same point of the scene at a time period that the image sensor moves a distance of one pixel.

Conventionally, the charge-coupled device (CCD) technology has been used for TDI applications because CCDs intrinsically operate by shifting charge from pixel to pixel across the image sensor to allow charges between pixels integrate when the image sensor moves across a same point of the imaged scene. However, CCD technology is relatively expensive to fabricate and CCD imaging devices consume relatively high power.

Although using a CMOS circuit can achieve lower power, higher degree of integration and higher speed, the existing designs suffer from higher noises. Although a 4-transistor (4T) structure can be used to minimize noises, the 4T pixels are clocked using a rolling shutter technique. Using the rolling shutter clocking can cause artifacts in the captured image since not all pixels are integrated over the same time period.

Therefore, U.S. Pat. No. 9,148,601 provides a CMOS image sensor for TDI imaging. Please refer to FIG. 1, the CMOS image sensor includes multiple pixel columns 112, and each pixel column is arranged to be parallel to an along-track direction $D_{a\_t}$. For compensating the integration interval of the rolling shutter of the CMOS image sensor, a physical offset 150 is further arranged between two adjacent pixels of each pixel column 112, wherein if the pixel column 112 has N rows, each physical offset 150 is equal to a pixel height divided by N.

Accordingly, the present disclosure further provides a TDI CMOS image sensor that implements the rolling shutter operation by spatial compensation.

SUMMARY

The present disclosure provides a TDI CMOS image sensor with a separation space determined according to the pixel height, the line time difference of a rolling shutter and the frame period.

The present disclosure further provides a TDI CMOS image sensor that changes the line time difference corresponding to different conditions with a fixed separation space.

The present disclosure further provides a TDI image sensor that performs in-pixel TDI to reduce reading time of pixel data.

The present disclosure provides a TDI image sensor to move with respect to a scene in an along-track direction. The image sensor includes a pixel array having multiple pixel columns. Each of the multiple pixel columns includes multiple pixels arranged in the along-track direction. The multiple pixel columns respectively include a first pixel and a second pixel adjacent to each other. The first pixel includes a first photodiode, a first floating diffusion node and a first transfer transistor connected between the first photodiode and the first floating diffusion node. The second pixel includes a second photodiode, a second floating diffusion node, a second transfer transistor connected between the second photodiode and the second floating diffusion node, and a second extra transfer transistor connected between the second photodiode and the first floating diffusion node.

The present disclosure further provides an operating method of a TDI image sensor that moves with respect to a scene in an along-track direction and includes a first pixel row and a second pixel column arranged in the along-track direction. The operating method includes the steps of: exposing the first pixel row and the second pixel row in a first exposure interval; transferring a first pixel data of the second pixel row to a floating diffusion node of each pixel of the first pixel row in a first transfer interval; exposing the first pixel row and the second pixel row in a second exposure interval; and transferring a second pixel data of the each pixel of the first pixel row to the floating diffusion node of the each pixel of the first pixel row in a second transfer interval, wherein the first pixel data and the second pixel data are pixel data corresponding to a same position of the scene.

In the present disclosure, the separation space is not directly related to a size of the pixel array (i.e. a number of pixels), and the separation space can be determined as long as the frame period and the line time difference have been determined.

BRIEF DESCRIPTION OF THE DRAWINGS

Other objects, advantages, and novel features of the present disclosure will become more apparent from the following detailed description when taken in conjunction with the accompanying drawings.

FIGS. 7A to 7C are operational schematic diagrams of the TDI CMOS image sensor of FIG. 2 at different line time differences.

FIGS. 8A to 8C are other operational schematic diagrams of the TDI CMOS image sensor of FIG. 2 at different line time differences.

FIGS. 9A to 9C are operational schematic diagrams of the TDI CMOS image sensor of FIG. 5 at different line time differences.

FIG. 12 is a schematic diagram of operations of the TDI CMOS image sensor in FIGS. 10 and 11.

DETAILED DESCRIPTION OF THE EMBODIMENT

It should be noted that, wherever possible, the same reference numbers will be used throughout the drawings to refer to the same or like parts.

The CMOS image sensor of the present disclosure compensates a line time difference in time delay integration (TDI) imaging using a rolling shutter by arranging a separation space between pixels in an along-track direction. Accordingly, pixel data corresponding to the same position of an imaged scene is integrated in successive image frames so as to increase the signal-to-noise ratio (SNR), wherein a number of integration is related to a size of pixel array.

The concept of TDI imaging is known to the art, and the present disclosure is to eliminate the imaging distortion generated in a TDI CMOS image sensor using rolling shutter technique.

Figure 2:
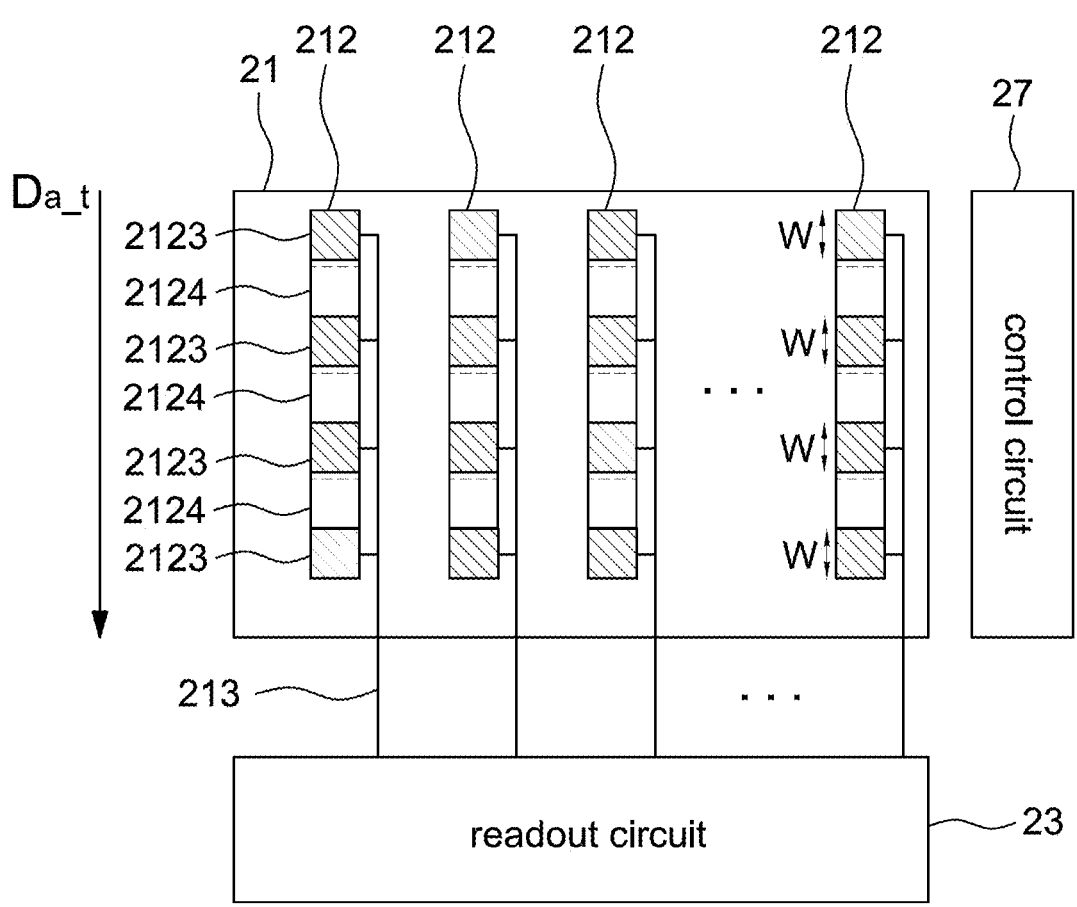
FIG. 2 is a schematic diagram of a TDI CMOS image sensor according to a first embodiment of the present disclosure.

Please refer to FIG. 2, it is a schematic diagram of a TDI CMOS image sensor 200 according to a first embodiment of the present disclosure. The TDI CMOS image sensor 200 captures image frames using a rolling shutter, and moves toward an along-track direction Dat with respect to a scene, wherein the scene is determined according to an application of the TDI CMOS image sensor 200. For example, when the TDI CMOS image sensor 200 is applied to a scanner, the scene is a scanned document; whereas, when the TDI CMOS image sensor 200 is applied to a satellite or aircraft, the scene is a ground surface.

The operation of the rolling shutter is known to the art, and thus details thereof are not described herein.

The TDI CMOS image sensor 200 includes a pixel array 21. The pixel array 21 includes multiple pixel columns 212. Each of the pixel columns 212 includes multiple pixels 2123 (e.g., shown as regions filled with slant lines herein) arranged in the along-track direction $D_{a\_t}$ (e.g., shown as a longitudinal direction of the pixel array 21). Two adjacent pixels of each pixel column 212 have a separation space 2124 (e.g., shown as blank regions herein) therebetween.

Figure 3:
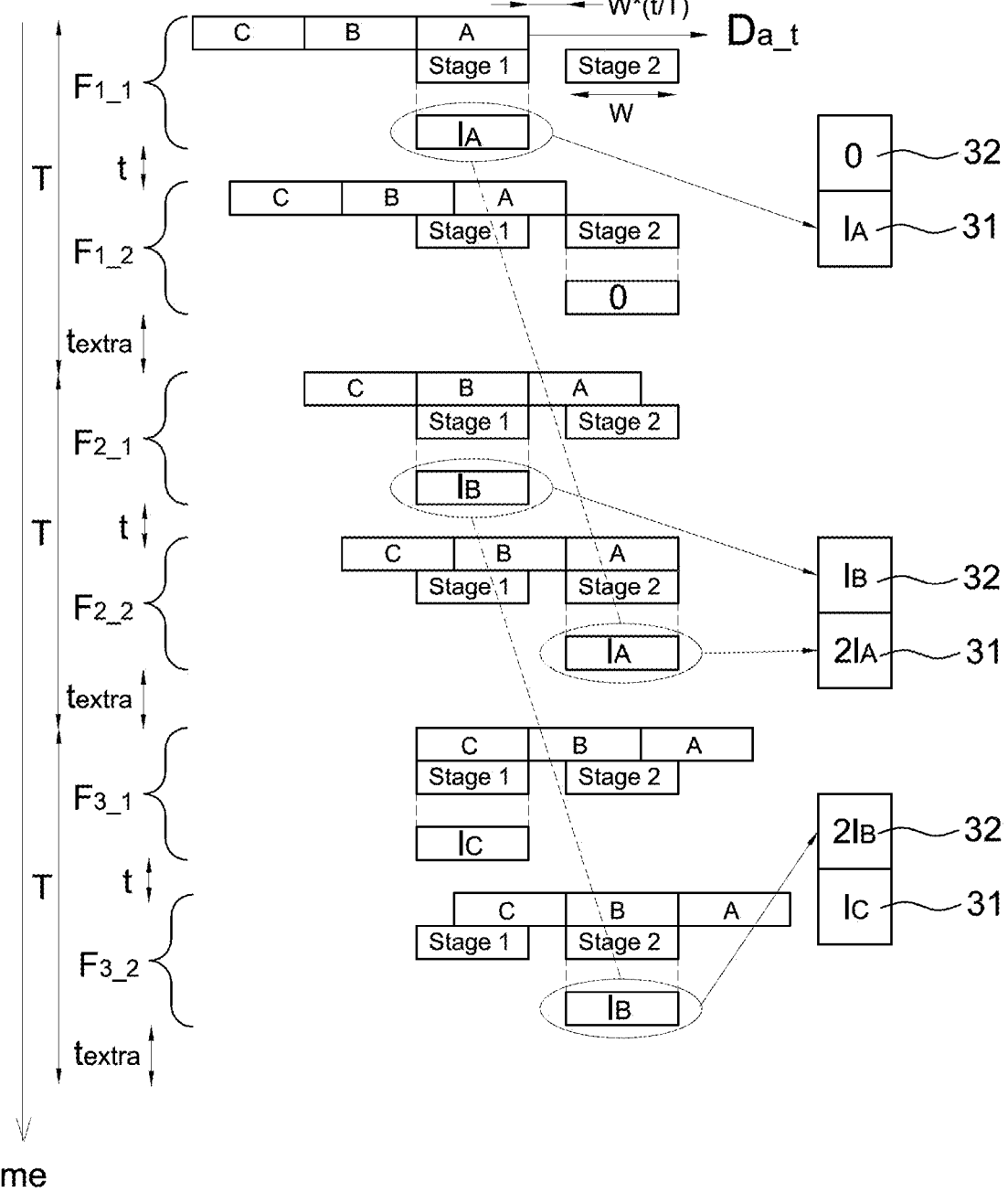
FIG. 3 is an operational schematic diagram of the TDI CMOS image sensor of FIG. 2.

Please refer to FIG. 3, it is an operational schematic diagram of the TDI CMOS image sensor 200 of FIG. 2. In one aspect, the separation space 2124 is equal to a multiplication of a pixel height W of one pixel 2123 in the along-track direction $D_{a\_t}$ by a time ratio of a line time difference t of the rolling shutter and a frame period T of capturing the image frame (e.g., FIG. 3 showing three image frames), i.e. separation space=W×t/T.

In the present disclosure, the line time difference t is a time interval between a time of starting or ending exposure of two adjacent pixel rows.

In FIG. 3, it is assumed that the scene includes 3 positions or objects A, B and C moving rightward (i.e. along-track direction $D_{a\_t}$). Stage1 and Stage2 indicate two pixel rows of each pixel column 212, wherein the separation space W×t/T is arranged between Stage1 and Stage2. In the present disclosure, the frame period T is determined according to brightness of the scene and a sensitivity of the pixel array 21. A moving speed of the TDI CMOS image sensor 200 is set as the pixel height W divided by the frame period T.

Because FIG. 3 assumes that the pixel column 212 of the pixel array 21 has two pixel rows, the frame period T, in which the TDI CMOS image sensor 200 captures one image frame, includes two line times, which have a line time difference t. Herein, a line time is referred to a processing time interval for accomplishing the exposing and reading of one pixel row. For example, FIG. 3 shows that a first image frame includes two pixel rows $F_{1\_1}$ and $F_{1\_2}$; a second image frame includes two pixel rows $F_{2\_1}$ and $F_{2\_2}$; and a third image frame includes two pixel rows $F_{3\_1}$ and $F_{3\_2}$.

In this embodiment, the TDI CMOS image sensor 200 further includes multiple integrators, e.g., FIG. 3 showing two integrators 31 and 32, wherein the integrators are, for example, a buffer (i.e. digital integrator) or a capacitor (i.e. analog integrator), and a number of the integrators are preferably corresponding to a number of pixel columns 212 so as to determine a width of the imaged scene. The integrators 31 and 32 are respectively used to integrate pixel data in adjacent image frames corresponding to a same position or object of the scene.

For example, in the first image frame (e.g., including $F_{1\_1}$ and $F_{1\_2}$), Stage1 senses pixel data of the position or object A of the scene, and integrates (or adds) to the integrator 31, e.g., shown as $I_A$; now, the integrator 32 does not yet integrate (or store) any pixel data, e.g., shown as 0.

As the scene moves in the along-track direction $D_{a\_t}$ at a speed W/T, in the second image frame (e.g., including $F_{2\_1}$ and $F_{2\_2}$), Stage1 senses pixel data of the position or object B of the scene, and integrates (or adds) to the integrator 32, e.g., shown as $I_B$; and Stage2 senses pixel data of the position or object A of the scene, and integrates (or adds) to the integrator 31, e.g., shown as $2I_A$ (indicating integrated by two times).

As the scene continuously moves in the along-track direction Dat at the speed W/T, in the third image frame (e.g., including $F_{3\_1}$ and $F_{3\_2}$), the pixel data $2I_A$ associated with the object A already integrated in the integrator 31 is read out at first. Next, Stage1 senses pixel data of the position or object C of the scene, and integrates (or adds) to the integrator 31, e.g., shown as $I_C$; and Stage2 senses pixel data of the position or object B of the scene, and integrates (or adds) to the integrator 32, e.g., shown as $2I_B$ (indicating integrated by two times). When the scene is continuously imaged, the TDI CMOS image sensor 200 continuously integrates and reads pixel data using the process as shown in FIG. 3 to improve the SNR of the captured image frame.

In one aspect, the frame period T (or called exposure interval of one image frame) is larger than a summation of row exposure times for capturing all pixel rows of the pixel array 21 using the rolling shutter, e.g., FIG. 3 showing that an extra time $t_{extra}$ is left after a second pixel row of every image frame is exposed and read.

In one non-liming aspect, within a time difference (i.e. $t_{extra}$) between the frame period T and the summation of row exposure times, the image sensor 200 enters a sleep mode to save power.

In one non-liming aspect, a column analog-to-digital converter (ADC) (e.g., included in the readout circuit 23) of the TDI CMOS image sensor 200 performs, within the time difference $t_{extra}$, the analog-digital (AD) conversion on pixel signals of auxiliary pixels (e.g., dark pixels), external voltages or temperatures of an external temperature sensor of the pixel array 21. More specifically, within the time difference $t_{extra}$, the column ADC is used to perform the AD conversion on sensing signals outside the pixel columns 212 so as to broaden applications of the TDI CMOS image sensor 200. In this aspect, a line time is preferably set as the minimum time required for processing one row of pixel data.

In this embodiment, the readout circuit 23 samples every pixel using, e.g., correlation double sampling (CDS).

Please refer to FIG. 2 again, in another aspect, the separation space 2124 is equal to a summation of a pixel height W in the along-track direction $D_{a\_t}$ and a multiplication of the pixel height W by a time ratio of a line time difference t of the rolling shutter and a frame period T of capturing the image frame, i.e. separation space=W×(y+t/T).

Figure 4A:
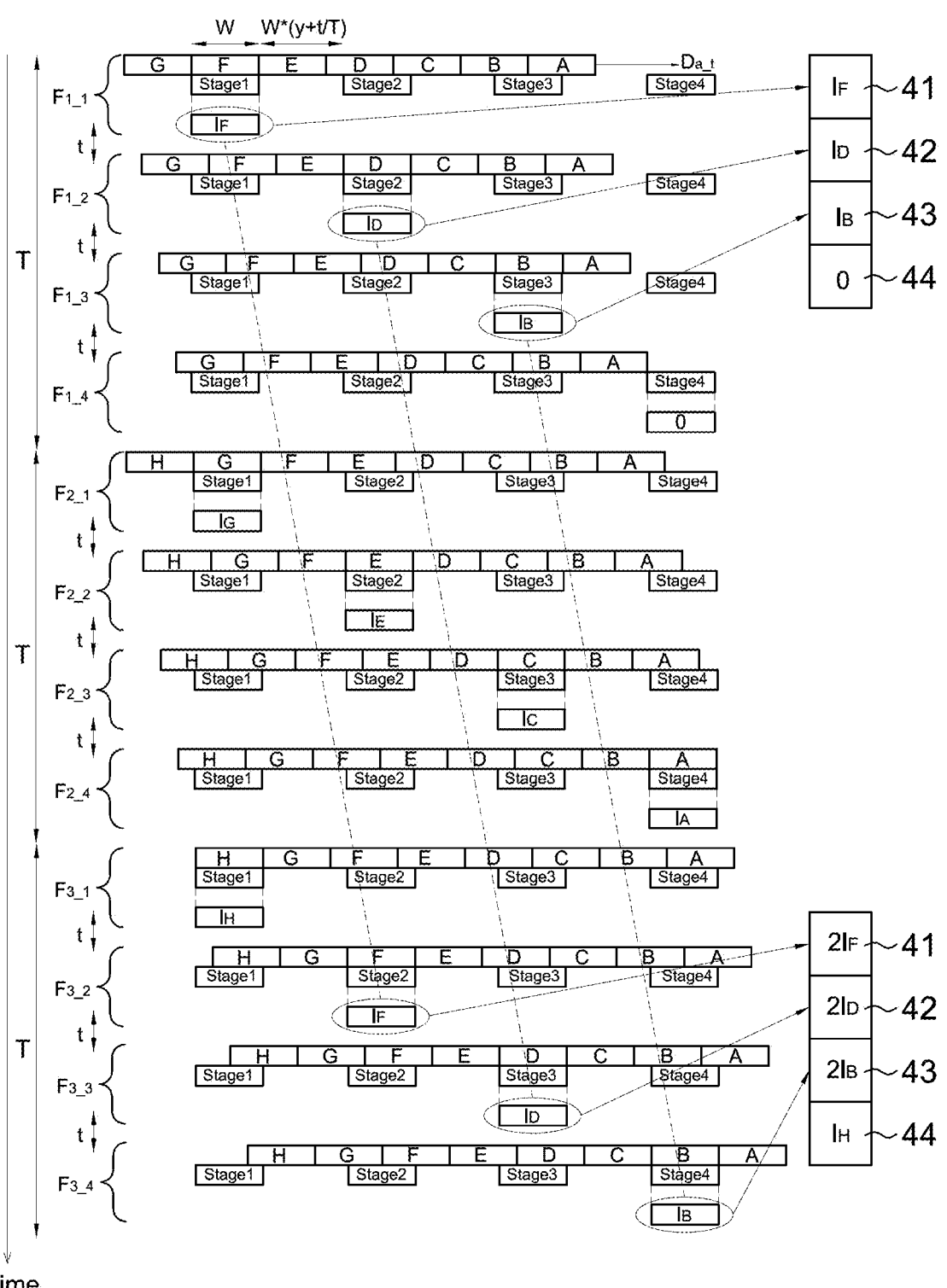
FIG. 4A is another operational schematic diagram of the TDI CMOS image sensor of FIG. 2.

Please refer to FIG. 4A together, it is another operational schematic diagram of the TDI CMOS image sensor 200 of FIG. 2. In FIG. 4A, it is assumed that one scene includes eight positions or objects A to H, and moves rightward (i.e. along-track direction $D_{a\_t}$). Stage1 to Stage 4 indicate four pixel rows of one pixel column 212, wherein the separation space W×(y+t/T) is arranged between two adjacent pixels, wherein y=0 or a positive integer. FIG. 4A shows an aspect that y=1; and an aspect of y=0 is shown in FIG. 3.

Because FIG. 4A assumes that the pixel array 21 includes four pixel rows, thus the frame period T of the TDI CMOS image sensor 200 for capturing one image frame includes four line times, which have a line time difference t from each other. For example, FIG. 4A shows that one image frame includes four pixel rows $F_{1\_1}$ to $F_{1\_4}$; a next image frame includes four pixel rows $F_{2\_1}$ to $F_{2\_4}$; and a further next image frame includes four pixel rows $F_{3\_1}$ to $F_{3\_4}$; and so on.

Similarly, the TDI CMOS image sensor 200 further includes multiple integrators, e.g., FIG. 4A showing four integrators 41 to 44. The integrator 41 is used to integrate pixel data in a first image frame (e.g., frame including $F_{1\_1}$ to $F_{1\_4}$) and a second image frame (e.g., frame including $F_{3\_1}$ to $F_{3\_4}$) corresponding to the same position (e.g., position or object F) of the scene, wherein the first image frame and the second image frame is separated by one image frame (e.g., frame including $F_{2\_1}$ to $F_{2\_4}$). The operations of other integrators 42 to 44 are identical to that of the integrator 41, and the difference is in integrating the pixel data at different positions or objects.

It is seen from FIG. 4A that a first pixel (e.g., Stage1) in the first image frame for sensing pixel data (e.g., $I_F$) of the same position (e.g., F) and a second pixel (e.g., Stage2) in the second image frame for sensing pixel data (e.g., $I_F$) of the same position (e.g., F) are two adjacent pixels of the same pixel column 212 in the pixel array 21. Therefore, the integrators (e.g., 41 to 44) do not integrate the pixel data $I_F$ in the first pixel and the second pixel corresponding to the same position within a frame period of the one image frame between the first image frame and the second image frame. The sensing and integration of positions or objects D and B are shown by dashed lines and arrows in FIG. 4A.

In the aspect of FIG. 4A, because the integrators 41 to 44 integrate pixel data in the image frames separated by one image frame (e.g., frame including $F_{2\_1}$ to $F_{2\_4}$) corresponding to the same position or the same object of a scene, if it is assumed that the pixel columns 212 have N pixels, the integrators 41 to 44 integrate N/2 times of pixel data corresponding to the same position or the same object of the scene.

The pixel data of the image frame $F_{2\_1}$ to $F_{2\_4}$ is integrated in another group of integrators, wherein the pixel data of the same position or the same object of the scene is also integrated by skipping one image frame (e.g., frame including $F_{3\_1}$ to $F_{3\_4}$).

When y=n, a same position of the scene is sensed by a next adjacent pixel of the same pixel column 212 after n image frames. As long as the control signal outputted by the control circuit 27 is properly arranged, the pixel data of the same position or object of the scene is accurately integrated in the same integrator.

Figure 4B:
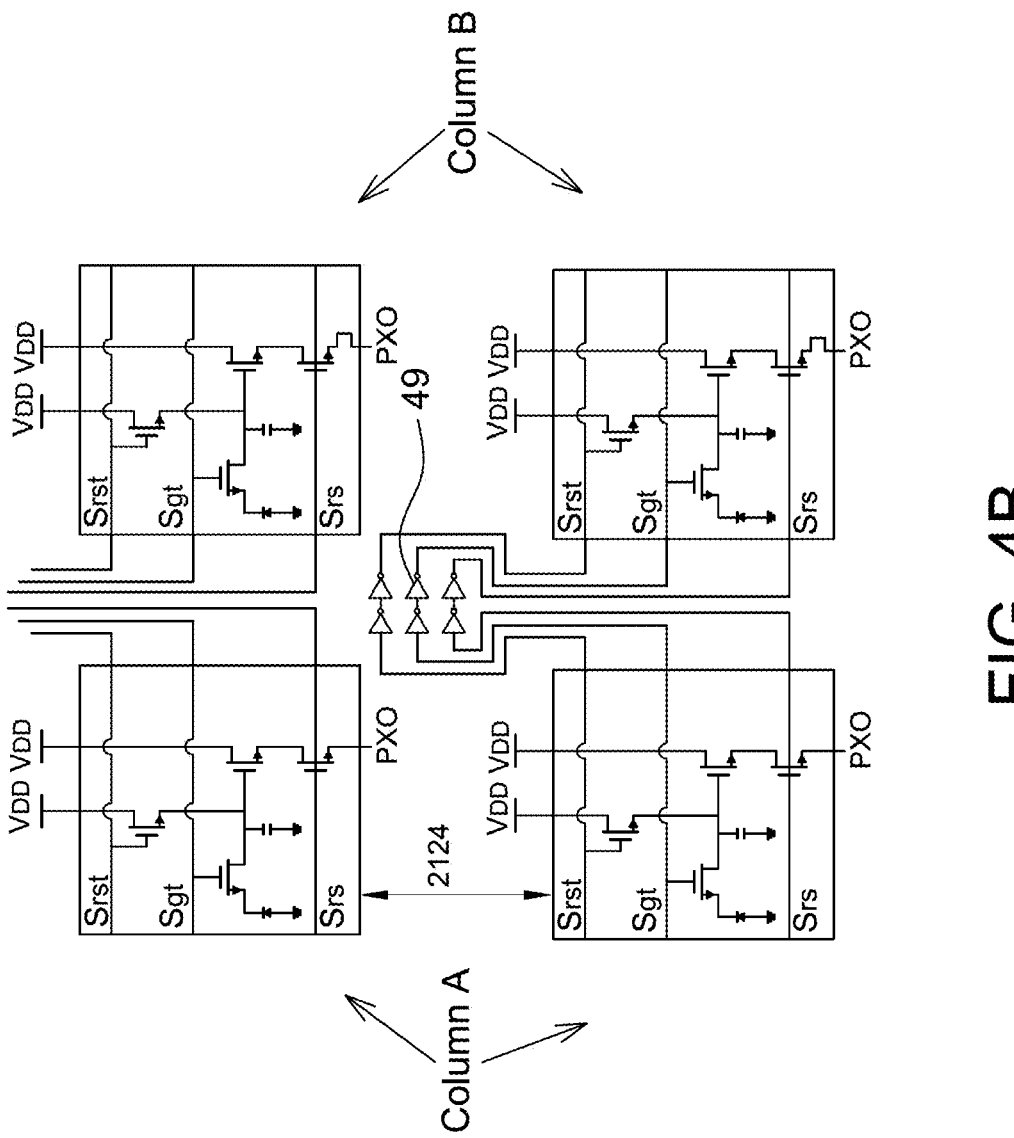
FIG. 4B is a schematic diagram of arranging buffers within the separation space of the TDI CMOS image sensor of FIG. 2.

In addition, in the aspect of FIG. 4A, because adjacent pixels of the pixel columns 212 have a larger separation space 2124, in the case that a wider imaged scene image is required, it is possible to arrange buffers in the separation space 2124 every predetermined number of pixel columns to buffer or amplify control signals of the pixel row. For example as shown in FIG. 4B, in the separation space 2124, the buffers 49 are arranged to buffer or amplify pixel control signals, e.g., including the reset signal Srst, signal transfer signal Sgt and row selection signal Srs, but not limited to. In this way, even a pixel array having a large number of pixel columns can still operate accurately.

Figure 5:
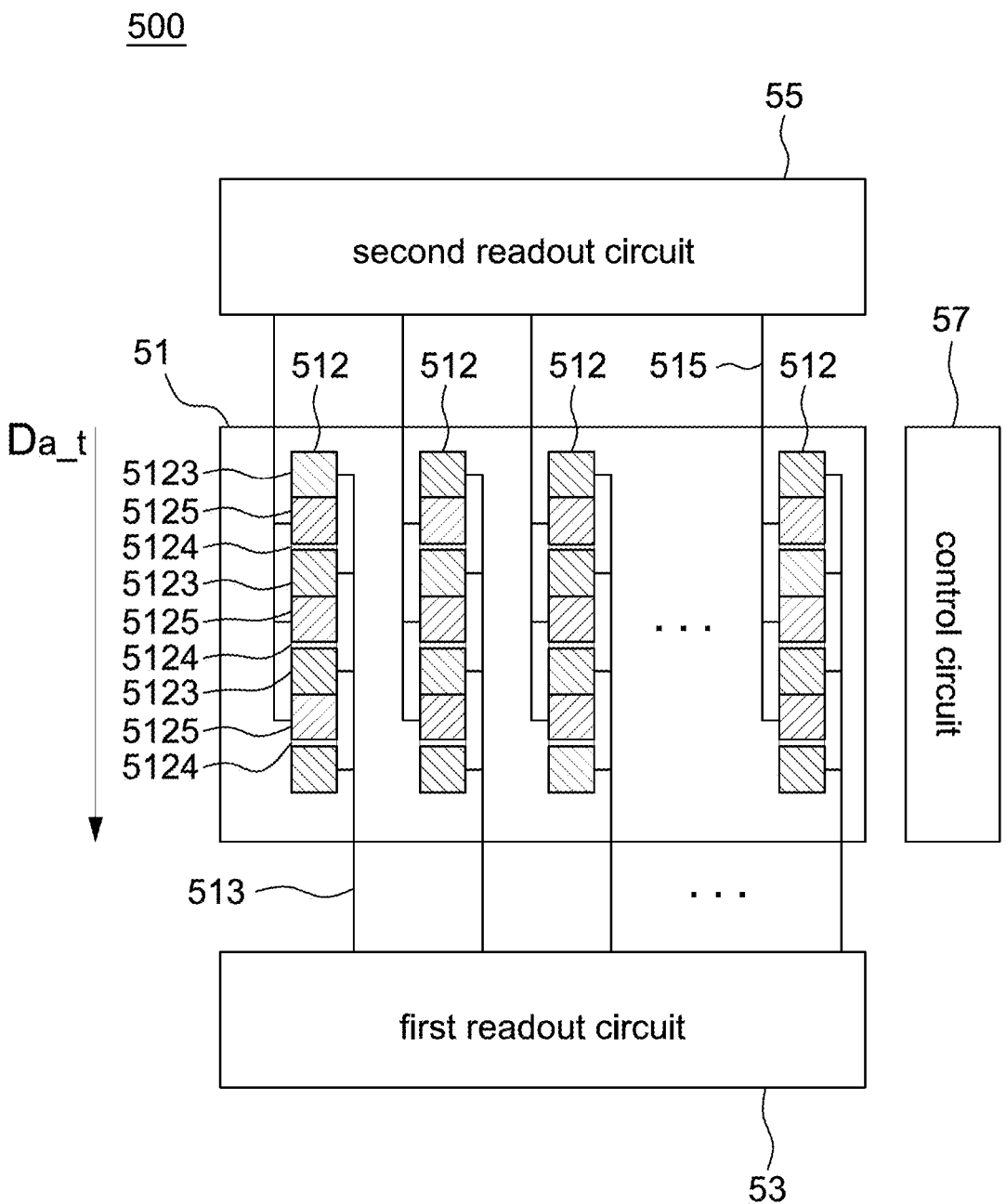
FIG. 5 is a schematic diagram of a TDI CMOS image sensor according to a second embodiment of the present disclosure.

Please refer to FIG. 5, it is a schematic diagram of a TDI CMOS image sensor 500 according to a second embodiment of the present disclosure. The TDI CMOS image sensor 500 is also captures an image frame using a rolling shutter, and moves toward an along-track direction $D_{a\_t}$ with respect to a scene.

The TDI CMOS image sensor 500 includes a pixel array 51. The pixel array 51 includes multiple pixel columns 512 each including multiple pixels arranged in the along-track direction $D_{a\_t}$. A separation space 5124 is arranged between two adjacent pixel groups to compensate a line time difference in using the rolling shutter, wherein each pixel group includes a first pixel 5123 and a second pixel 5215 directly connected to each other, i.e. no separation space 5124 therebetween.

The TDI CMOS image sensor 500 further includes a first readout circuit 53 and a second readout circuit 55. As shown in FIG. 5, the first readout circuit 53 is coupled to multiple first pixels 5123 in the pixel columns 512 via a readout line 513 so as to read pixel data of the first pixels 5123, and the second readout circuit 55 is coupled to multiple second pixels 5125 in the pixel columns 512 via a readout line 515 so as to read pixel data of the second pixels 5125.

Figure 6:
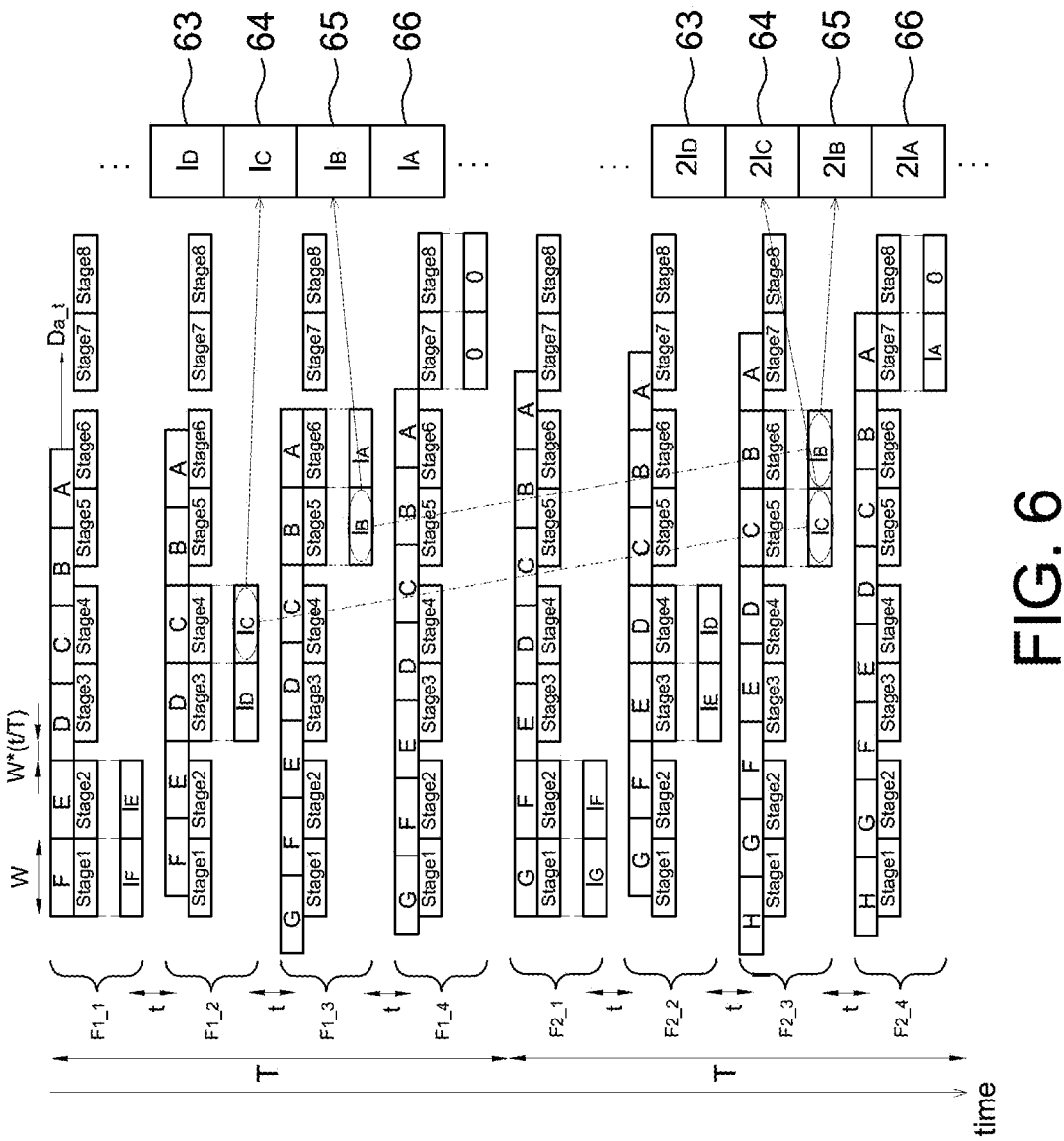
FIG. 6 is an operational schematic diagram of the TDI CMOS image sensor of FIG. 5.

Please refer to FIG. 6, it shows an operational schematic diagram of the TDI CMOS image sensor 500 in FIG. 5. In one aspect, the separation space 5124 is a multiplication of a pixel height W in the along-track direction $D_{a\_t}$ by a time ratio of a line time difference t of the rolling shutter and a frame period T of capturing the image frame (e.g., FIG. 6 showing two image frames), i.e. separation space=W×t/T.

In FIG. 6, it is assumed that a scene includes eight positions or objects A to H, and moves rightward (i.e. along-track direction $D_{a\_t}$).

In this embodiment, the readout circuits 53 and 55 uses, e.g., CDS to sample every pixel. In FIG. 6, Stage1 and Stage2, Stage3 and Stage 4, Stage5 and Stage 6, Stage7 and Stage 8 respectively indicate one pixel group of one pixel column 512, wherein Stage1, Stage3, Stage5 and Stage7 are first pixels 5123, and Stage2, Stage4, Stage6 and Stage8 are second pixels 5125. The separation space W×t/T is arranged between two adjacent pixel groups.

Because it is assumed that the pixel array 51 in FIG. 6 has four pixel groups in the along-track direction $D_{a\_t}$, a frame period T that the TDI CMOS image sensor 500 captures one image frame includes 4 line times, which have a line time difference t between each other. For example, FIG. 6 shows that a first image frame includes four rows of pixel groups $F_{1\_1}$ to $F_{1\_4}$; and a second image frame includes four rows of pixel groups $F_{2\_1}$ to $F_{2\_4}$.

In this embodiment, the first pixel 5123 and the second pixel 5125 of each pixel group are exposed simultaneously, and the pixel data thereof is respectively integrated by the first readout circuit 53 and the second readout circuit 55 simultaneously.

For example, in the line time of $F_{1\_2}$ of a first image frame (e.g., frame including $F_{1\_1}$ to $F_{1\_4}$), Stage3 and Stage4 are exposed at the same time, and pixel data of Stage3 (e.g., $I_D$) is integrated by the first readout circuit 53 to the integrator 63, and pixel data of Stage4 (e.g., $I_C$) is integrated by the second readout circuit 55 to the integrator 64. In the line time of $F_{1\_3}$ of the first image frame, Stage5 and Stage6 are exposed at the same time, and pixel data of Stage5 (e.g., $I_B$) is integrated by the first readout circuit 53 to the integrator 65, and pixel data of Stage6 (e.g., $I_A$) is integrated by the second readout circuit 55 to the integrator 66. The exposure and integration of other line times in a frame period T of the first image frame are similar to the line times $F_{1\_2}$ and $F_{1\_3}$.

For example, in the line time of $F_{2\_3}$ of a second image frame (e.g., frame including $F_{2\_1}$ to $F_{2\_4}$), Stage5 and Stage6 are exposed at the same time, and pixel data of Stage5 (e.g., $I_C$) is integrated by the first readout circuit 53 to the integrator 64, shown as $2I_C$ indicating integrated by two times; and pixel data of Stage6 (e.g., $I_B$) is integrated by the second readout circuit 55 to the integrator 65, shown as $2I_B$ indicating integrated by two times. The exposure and integration of other line times in a frame period T of the second image frame are similar to the line times $F_{2\_3}$.

For example, the first readout circuit 53 and the second readout circuit 55 are respectively coupled to each integrator via a switching device (e.g., a multiplexer, but not limited thereto). The switching device is controlled by a control signal (e.g., generated by the control circuit 57) to integrate pixel data read by the first readout circuit 53 or the second readout circuit 55 to the same integrator. It is appreciated that FIG. 6 shows only a part of integrators for describing the present disclosure.

More specifically, multiple integrators of the TDI CMOS image sensor 500 respectively store pixel data in the first image frame (e.g., frame including $F_{1\_1}$ to $F_{1\_4}$) and the second image frame (e.g., frame including $F_{2\_1}$ to $F_{2\_4}$), adjacent to each other, corresponding to the same position (e.g., B) of a scene, wherein in the first image frame, pixel data (e.g. $I_B$) corresponding to a same position (e.g., B) of the scene is read by the first readout circuit 53 and integrated to an integrator 65; and in the second image frame, the pixel data (e.g. $I_B$) corresponding to the same position (e.g., B) of the scene is read by the second readout circuit 55 and integrated to the integrator 65. As long as the output signal of the control circuit 57 is corresponding arranged, the pixel data read from different readout circuits is correctly integrated in the same integrator. The method of integrating pixel data of associated pixels by other integrators is similar to the descriptions in this paragraph, and thus is not repeated herein.

In other aspects, the above embodiments of FIG. 2 and FIG. 5 are combinable. For example, a separation space between two adjacent pixel groups is a summation of a pixel height W and a multiplication of the pixel height W by a time ratio of a line time difference t of the rolling shutter and a frame period T of capturing the image frame, i.e. separation space=W×(y+t/T).

In some aspects, the TDI CMOS image sensors 200 and 500 of the present disclosure are operated in different modes, e.g., including a normal mode and a de-noise mode. For example, in the normal mode, the TDI CMOS image sensors 200 and 500 are operated using FIG. 3 to FIG. 4A and FIG. 6 as mentioned above. In a poor environmental condition (e.g., ambient light intensity being smaller than a threshold or noises larger than a noise threshold), the processor (e.g., MCU, DSP or ASIC) of the TDI CMOS image sensors 200 and 500 automatically selects an operation mode according to a current environmental condition, or the user selects the current operation mode using a key, a switch or an APP of the TDI CMOS image sensors 200 and 500.

The processor is connected to the integrators (e.g., 31 to 32, 41 to 44, 63 to 66, 71 to 73, 81 to 84 or 91 to 98) to receive the integrated pixel data for the post-processing.

Details of the TDI CMOS image sensors 200 and 500 having different operation modes are illustrated by an example below. In the de-noise mode, the line time difference of the rolling shutter is twice as that in the normal mode, i.e. 2t. For example, in the de-noise mode, multiple pixels of the TDI CMOS image sensors 200 and 500 are, within every line time, strong exposed (e.g., having longer exposure time and/or higher gain) to acquire a bright image frame and weak exposed (e.g., having shorter exposure time and/or lower gain) to acquire a dark image frame. Said bright and dark image frames are differenced by a pixel circuit or the readout circuit to generate a difference image frame so as to eliminate noises. The condition needs to change the line time difference is determined according to different applications.

In addition, in one aspect, in the normal mode (e.g., one line time difference t) and the de-noise mode (e.g., double line time difference 2t), the TDI CMOS image sensors 200 and 500 move at the same moving speed with respect to the scene.

Figure 7A:
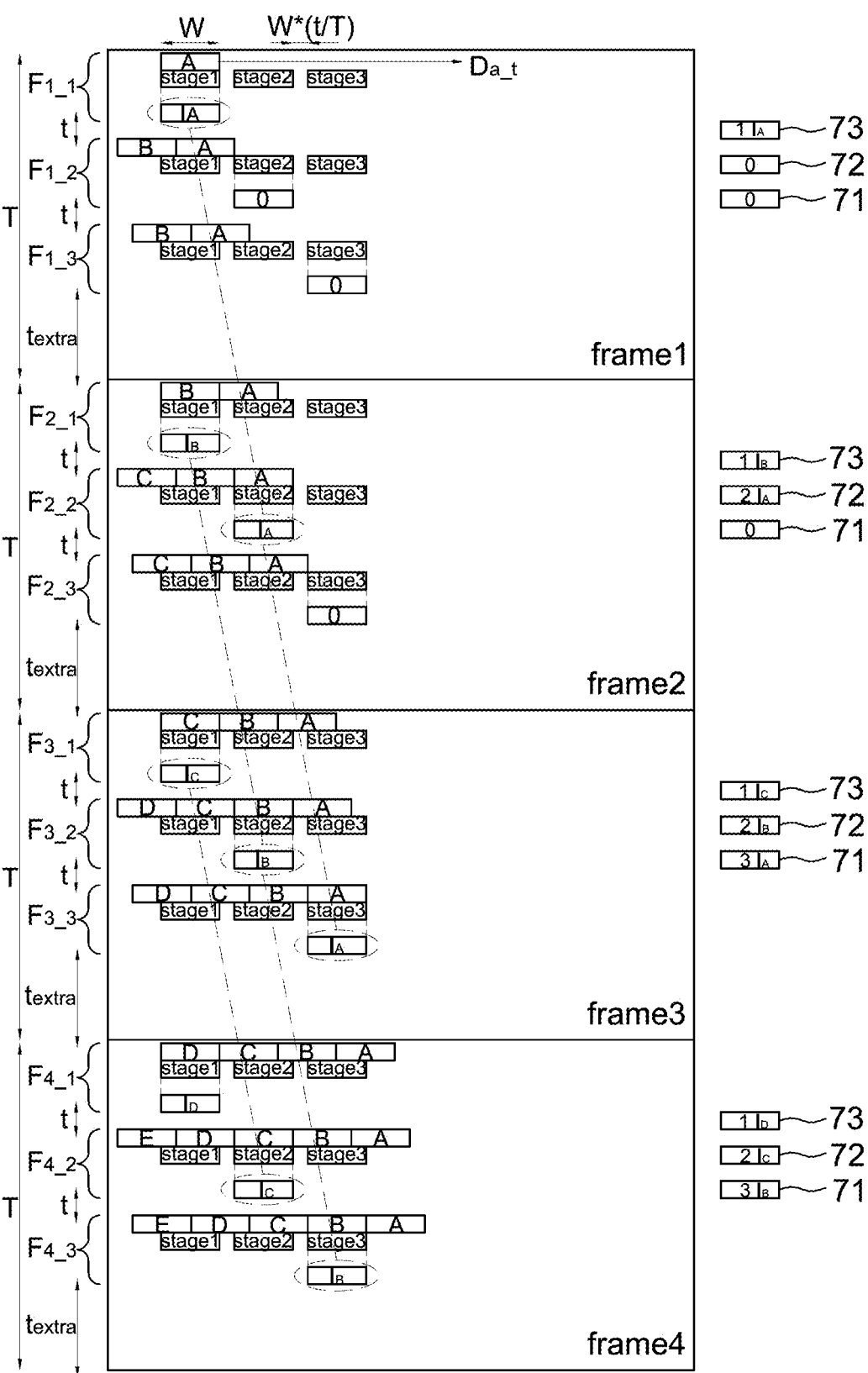
Figure 7B:
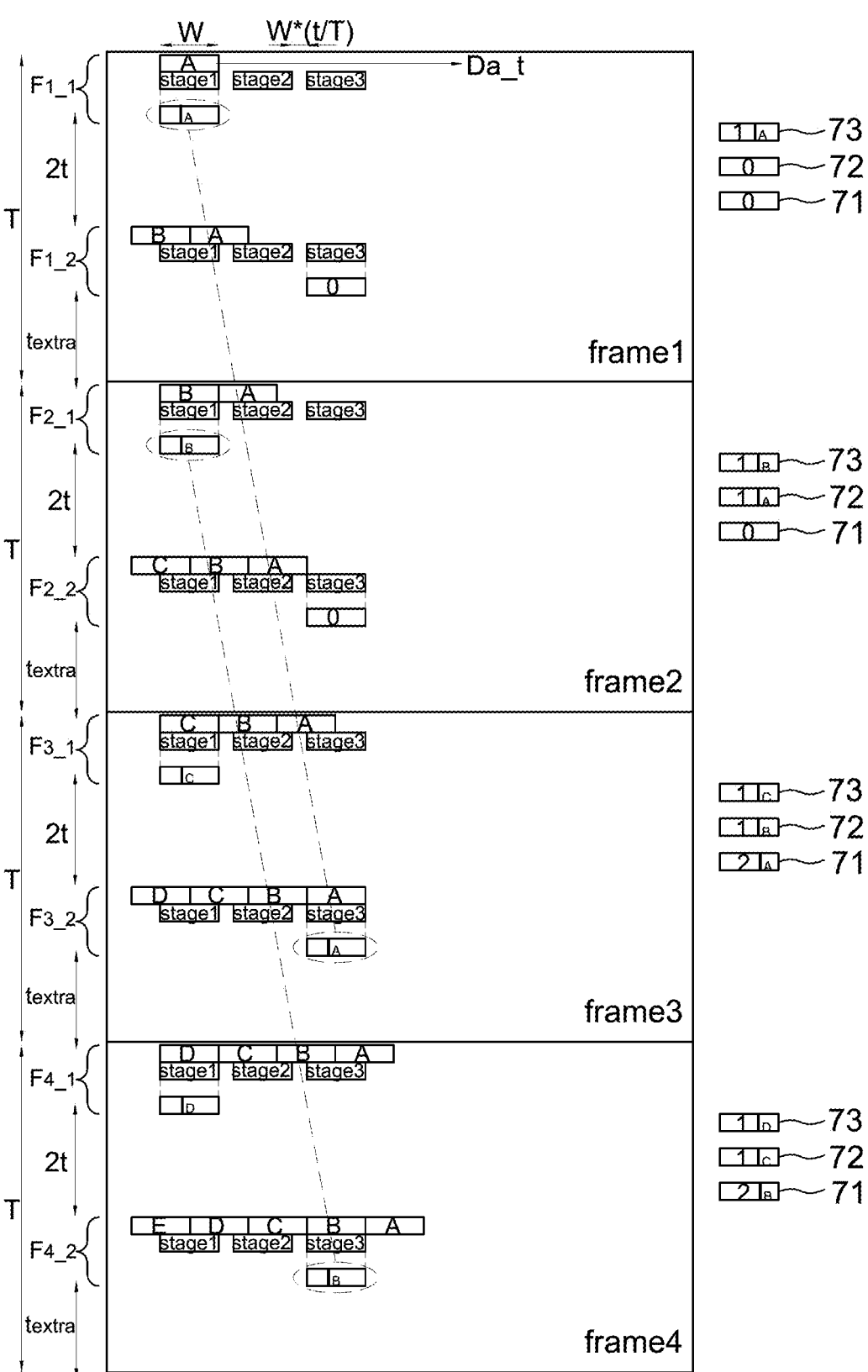

Please refer to FIGS. 7A to 7C, they are operational schematic diagrams of the TDI CMOS image sensor 200 of FIG. 2 operating at different line time differences, wherein the separation space 2124 is equal to W×(t/T). In this aspect, FIG. 7A is the operational schematic diagram of one line time difference; FIG. 7B is the operational schematic diagram of double line time difference; and FIG. 7C is the integration and output of pixel data of the TDI CMOS image sensor 200 at different line time differences.

Since the embodiments of FIGS. 7A to 7C are also adaptable to the TDI CMOS image sensor 200 of FIG. 2, the pixel array 21 thereof includes multiple pixel columns 212 each including multiple pixels 2123 arranged in an along-track direction $D_{a\_t}$, and two adjacent pixels of each of the pixel columns 212 has a separation space 2124 therebetween. In one aspect, the separation space 2124 is a multiplication of a pixel height W in the along-track direction $D_{a\_t}$ by a time ratio of a line time difference t of the rolling shutter and a frame period T of capturing an image frame, and details thereof have been illustrated above.

In this aspect, the TDI CMOS image sensor 200 is illustrated in a way including three integrators 71 to 73. Similarly, the integrators 71 to 73 respectively store pixel data in continuous image frames corresponding to the same position of an imaged scene.

In the normal mode shown in FIG. 7A, the operation of the TDI CMOS image sensor 200 is similar to FIG. 3, i.e. each of the integrators 71 to 73 integrating pixel data in adjacent image frames (e.g., shown as frame1 to frame4) corresponding to the same position of the imaged scene. As shown in FIGS. 7A and 7C, the pixel data $I_A$ of the position or object A is integrated (e.g., shown as $1I_A$, $2I_A$ and $3I_A$) to the integrator in the image frames 1 to 3. In FIGS. 7A and 7C, the integrators 71 to 73 are, for example, first-in-first-out (FIFO) buffers, such that data in one integrator is moved to a next integrator after one image frame. The integrator 71 outputs final integrated pixel data to the processor, but the present disclosure is not limited thereto. The method of integrating pixel data is possibly performed using FIG. 3, i.e. pixel data associated with the same pixel is integrated (or added) to the same integrator.

In the de-noise mode of FIG. 7B, each of the integrators 71 to 73 of the TDI CMOS image sensor 200 integrates pixel data in non-continuous image frames (e.g., separated by one image frame) corresponding to the same position of the imaged scene. As shown in FIGS. 7B and 7C, pixel data $I_A$ of the position or object A is integrated (e.g., respectively shown as $1I_A$ and $2I_A$) to the integrator in the image frames 1 and 3, but is not integrated (e.g., shown as $1I_A$) to the integrator in the image frame 2.

As shown in FIG. 7C, in the double line time difference, pixel data of the imaged position or object is not integrated in continuous image frames such that a number of times of integrating pixel data by each of the integrators 71 to 73 corresponding to the same position of the imaged scene is lower than a number of times of integrating pixel data in the one line time difference. For example FIG. 7C shows that in the one line time difference, the pixel data is integrated by 3 times, but in the double line time difference the pixel data in integrated by 2 times, but the present disclosure is not limited thereto.

Figure 8A:
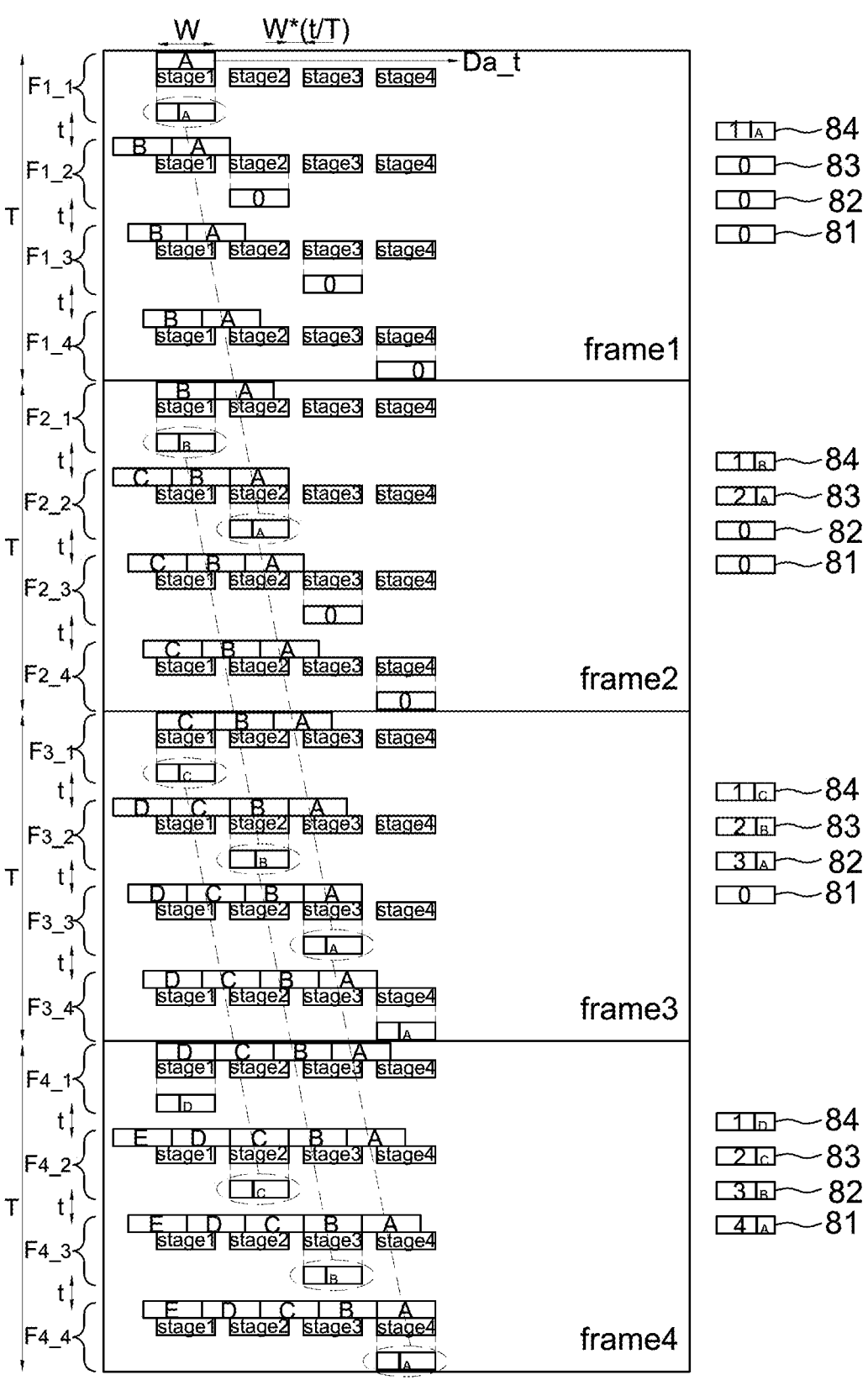
Figure 8B:
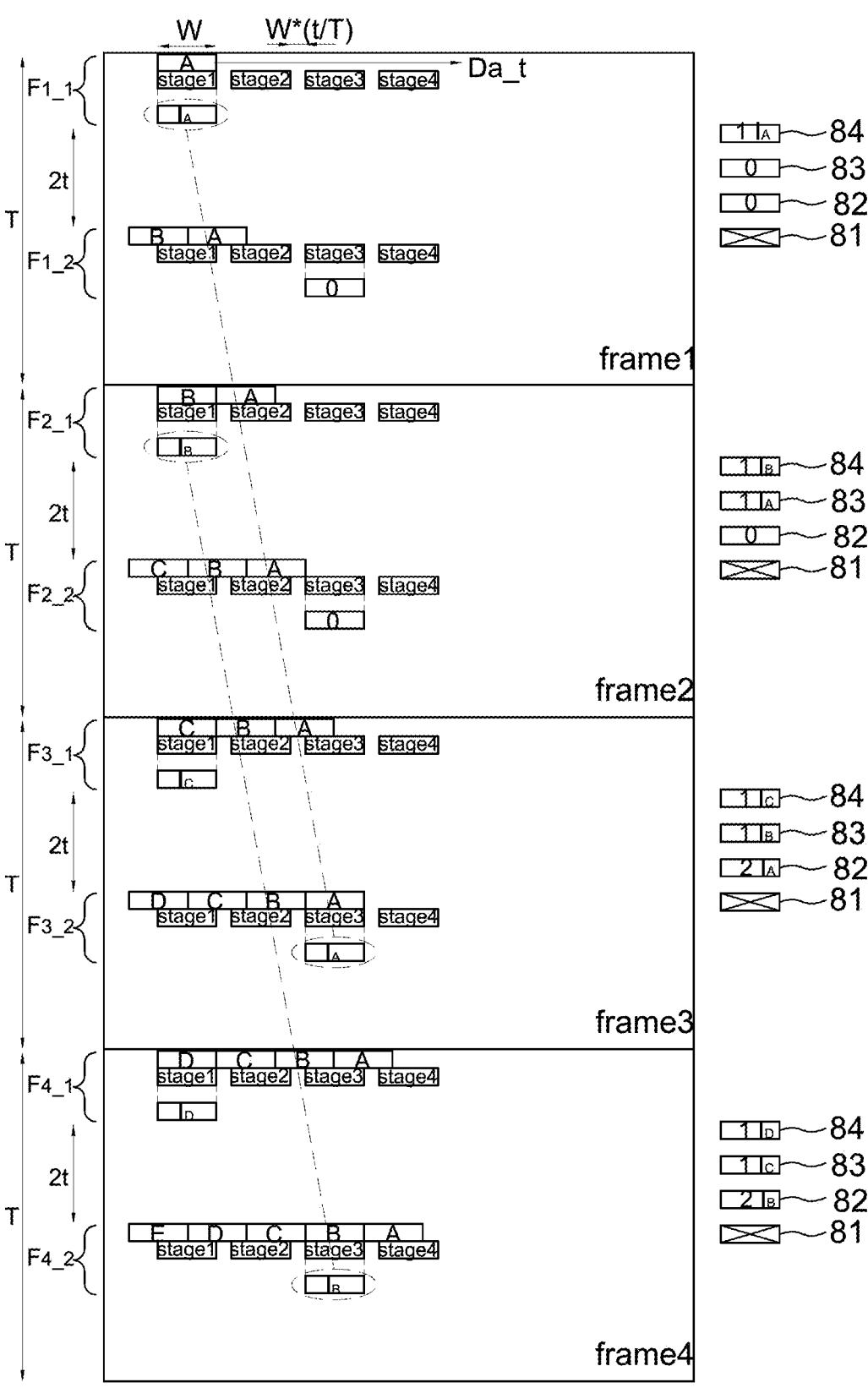

Please refer to FIGS. 8A to 8C, they are other operational schematic diagrams of the TDI CMOS image sensor 200 at different line time differences, wherein the separation space 2124 is equal to W×(t/T). In this aspect, FIG. 8A is the operational schematic diagram of one line time difference; FIG. 8B is the operational schematic diagram of double line time difference; and FIG. 8C is the integration and output of pixel data of the TDI CMOS image sensor 200 at different line time differences. The differences between FIGS. 8A to 8C and FIGS. 7A to 7C are that a number of pixels in every pixel column and a number of integrators are different.

Similarly, the multiple integrators 81 to 84 respectively store pixel data in successive image frames corresponding to the same position of an imaged scene, wherein in the one line time difference, each of the integrators 81 to 84 integrates pixel data in adjacent image frames corresponding to the same position of the imaged scene, e.g., FIGS. 8A and 8C showing that the pixel data $I_A$ is respectively $1I_A$, $2I_A$, $3I_A$, $4I_A$ in the image frames 1 to 4. In the double line time difference, each of the integrators 81 to 84 integrates pixel data in separated image frames corresponding to the same position of the imaged scene, e.g., FIGS. 8B and 8C showing that the pixel data $I_A$ is respectively $1I_A$, $2I_A$ corresponding to the image frames 1 and 3, but the pixel data $I_A$ is not integrated corresponding to the image frame 2.

In addition, FIG. 8B and FIG. 8C also show that in the double line time difference, a part of the integrators (e.g., integrator 81) is deactivated or bypassed, and the integrator(s) among the multiple integrators which does not operate in the double line time difference is not particularly limited.

It is assumed that the image frame 2, image frame 3, and image frame 4 are continuous image frames. In FIG. 8A, the readout circuit 23 (referring to FIG. 2) continuously reads pixel of the pixel columns in the image frame 3, e.g., pixel data of the pixels stage1, stage2 and stage3 are read and integrated to the corresponding integrator. In FIG. 8B, the readout circuit 23 non-continuously reads pixel of the pixel columns in the image frame 3, e.g., pixel data of only the pixels stage1 and stage3 is read and integrated to the corresponding integrator but pixel data of the pixel stage2 is not read.

Figure 9A:
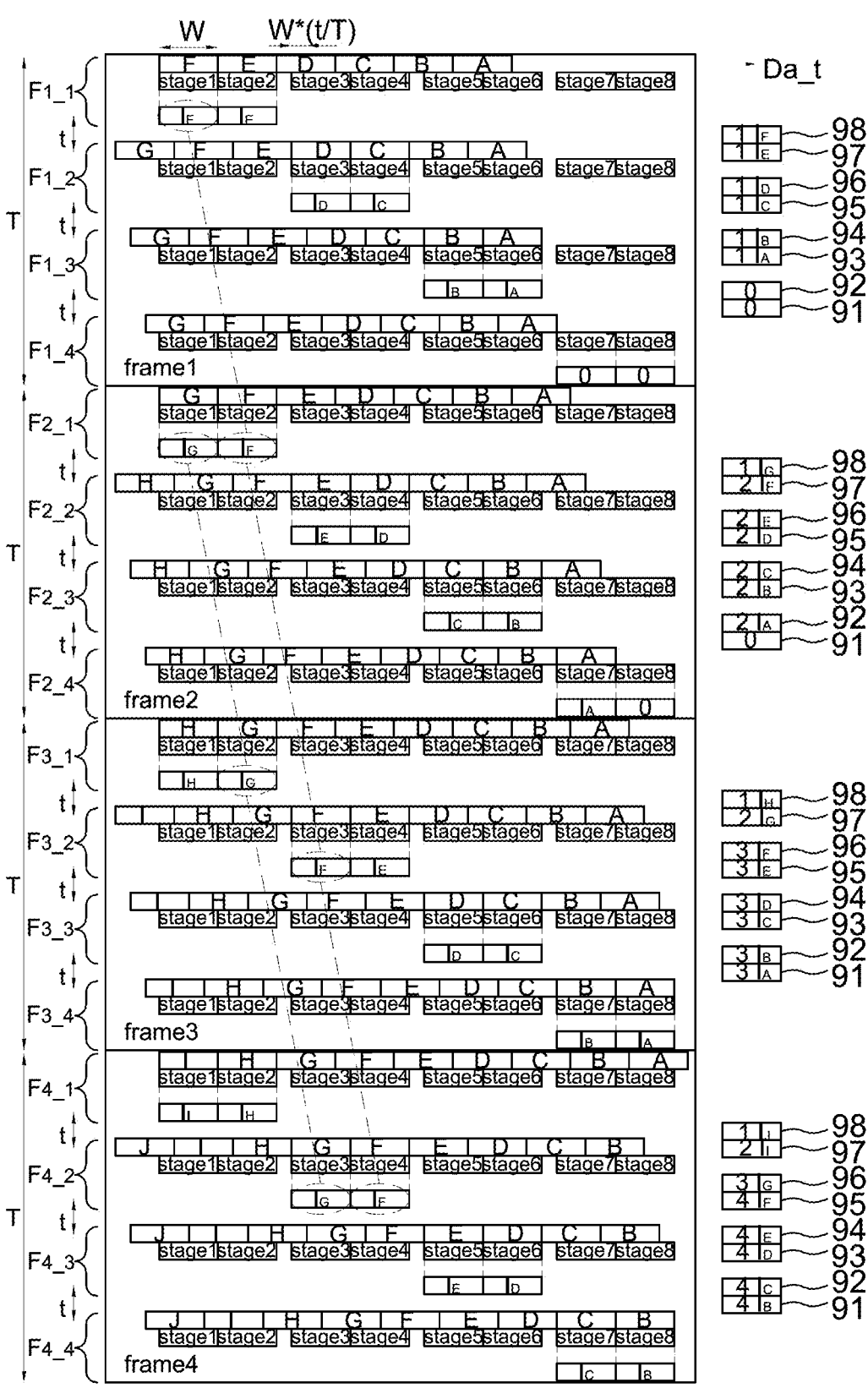
Figure 9B:
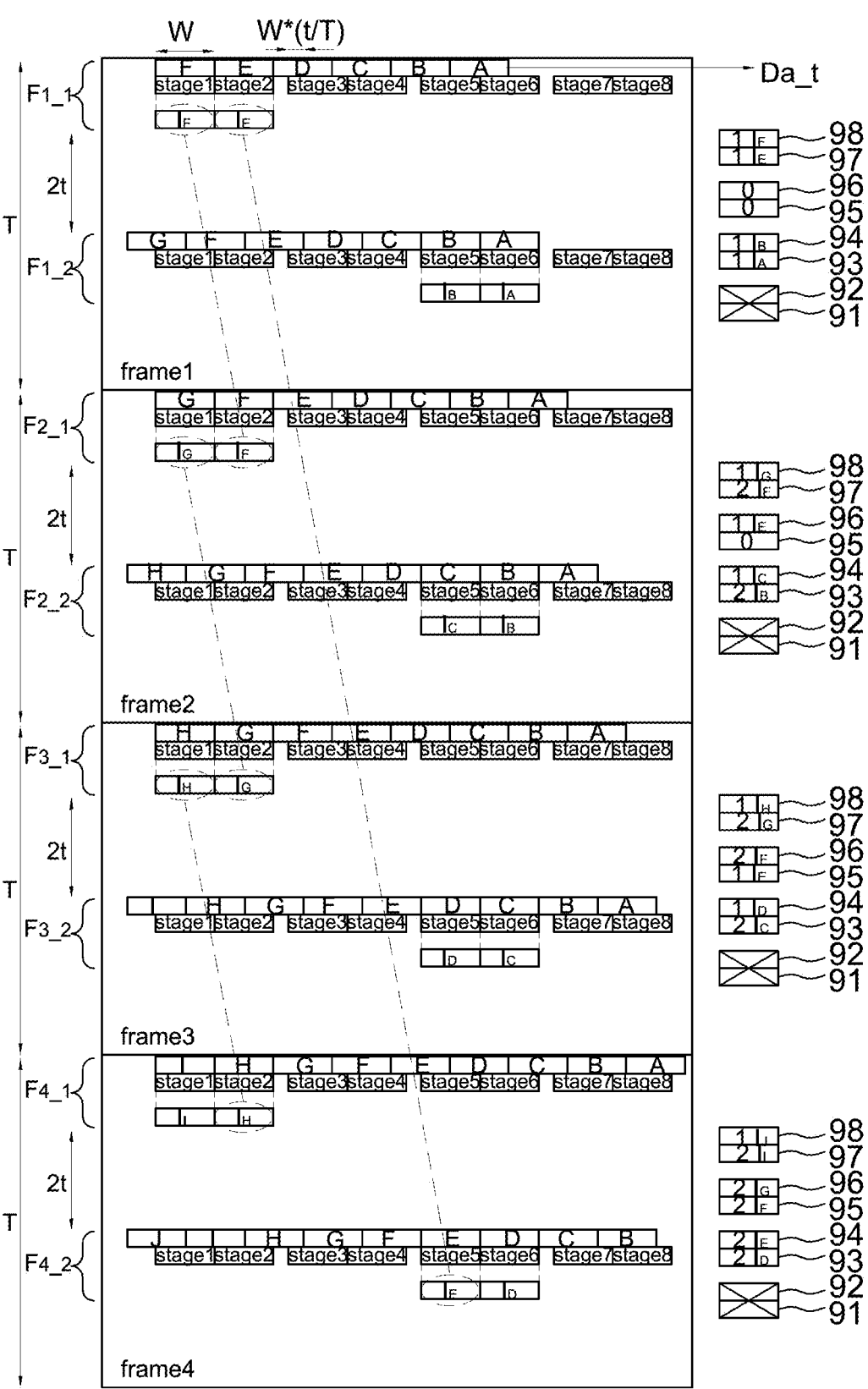

Please refer to FIGS. 9A to 9C, they are operational schematic diagrams of the TDI CMOS image sensor 500 at different line time differences, wherein the separation space 5124 between two pixel groups is W×(t/T). In this aspect, FIG. 9A is the operational schematic diagram of one line time difference; FIG. 9B is the operational schematic diagram of double line time difference; and FIG. 9C is the integration and output of pixel data of the TDI CMOS image sensor 500 at different line time differences.

Since the embodiments of FIGS. 9A to 9C are also adaptable to the TDI CMOS image sensor 500 of FIG. 5, the pixel array 51 thereof includes multiple pixel columns 512 each including multiple pixels arranged in an along-track direction $D_{a\_t}$, and two adjacent pixel groups of the pixels have a separation space 5124 therebetween to compensate a line time difference t of using the rolling shutter, wherein each pixel group includes a first pixel 5123 and a second pixel 5125. In this embodiment, the second pixel 5125 is arranged at a far end of the along-track direction $D_{a\_t}$, and the first pixel 5123 is arranged at a near end of the along-track direction $D_{a\_t}$.

In this aspect, the TDI CMOS image sensor 500 is illustrated in a way including eight integrators 91 to 98. Similarly, the integrators 91 to 98 respectively store pixel data in successive image frames corresponding to the same position of an imaged scene.

In the normal mode shown in FIG. 9A, the operation of the TDI CMOS image sensor 500 is similar to FIG. 6, i.e. each of the integrators 91 to 98 integrating pixel data in adjacent image frames (e.g., shown as frame1 to frame4) corresponding to the same position of the imaged scene. As shown in FIGS. 9A and 9C, the pixel data $I_F$ of the position or object F is integrated (e.g., shown as $1I_F$, $2I_F$, $3I_F$, $4I_F$, $5I_F$, $6I_F$, $7I_F$ and $8I_F$) to the integrator in the image frames 1 to 8. In FIGS. 9A and 9C, the integrators 91 to 93 are, for example, first-in-first-out (FIFO) buffers, such that the data in one integrator is moved to a next integrator after one image frame. The integrator 91 outputs final integrated pixel data to the processor, but the present disclosure is not limited thereto. The method of integrating pixel data is possibly performed using FIG. 6, i.e. the pixel data associated with the same pixel is integrated (or added) to the same integrator.

In the de-noise mode of FIG. 9B, each of the integrators associated with the first pixel 5123 integrates pixel data in a next image frame corresponding to the same position of the imaged scene, but each of the integrators associated with the second pixel 5123 does not integrate pixel data in the next image frame corresponding to the same position of the imaged scene. As shown in FIGS. 9B and 9C, in the image frame 1, pixel data $I_F$ of the position or object F (e.g., sensed by the pixel stage1, thus associated with the first pixel 5123) is read and integrated in the image frames 1 and 2; in the image frame 1, pixel data $I_E$ of the position or object E (e.g., sensed by the pixel stage2, thus associated with the second pixel 5125) is read and integrated in the image frames 1 and 4, but is not read and integrated in the image frames 2 and 3.

In other words, in this embodiment, in the double line time difference, the pixel data of a same position of the imaged scene is integrated to the associated integrator alternatively in adjacent image frames or spaced image frames. For example in FIGS. 9B and 9C, the pixel data $I_F$ of the position or object F is continuously read and integrated (e.g., respectively shown as $1I_F$ and $2I_F$) in image frames 1 and 2, but is not read or integrated (e.g., shown as $2I_F$) in image frames 3 and 4, and then is continuously read and integrated (e.g., respectively shown as $3I_F$ and $4I_F$) in image frames 5 and 6.

Similarly, because the pixel data of the imaged position or object is not continuously integrated in the double line time difference, a number of times of integrating the pixel data corresponding to the same position of the imaged scene by each of the integrators 91 to 98 is lower than a number of times being integrated in the one line time difference. For example, FIG. 9C shows that the pixel data is integrated (or added) by four times in the double line time difference, but is integrated (or added) by eight times in the one line time difference, but the present disclosure is not limited thereto.

Similarly, in FIGS. 9B and 9C, a part of the integrators (e.g., 91 and 92) are not activated or are bypassed, and the deactivated integrator(s) among the multiple integrators is not particular limited in the double line time difference.

Accordingly, the TDI CMOS image sensors 200 and 500 of the present disclosure select to be operated at difference line time differences with a fixed separation space.

In the above embodiments, the readout circuit reads pixel data once corresponding to every image frame. In the case that a speed of the readout circuit is limited, a TDI line rate is also limited by the frequent reading. Accordingly, the present disclosure further provides a TDI sensor using an in-pixel TDI to reduce a total reading time interval.

Figure 10:
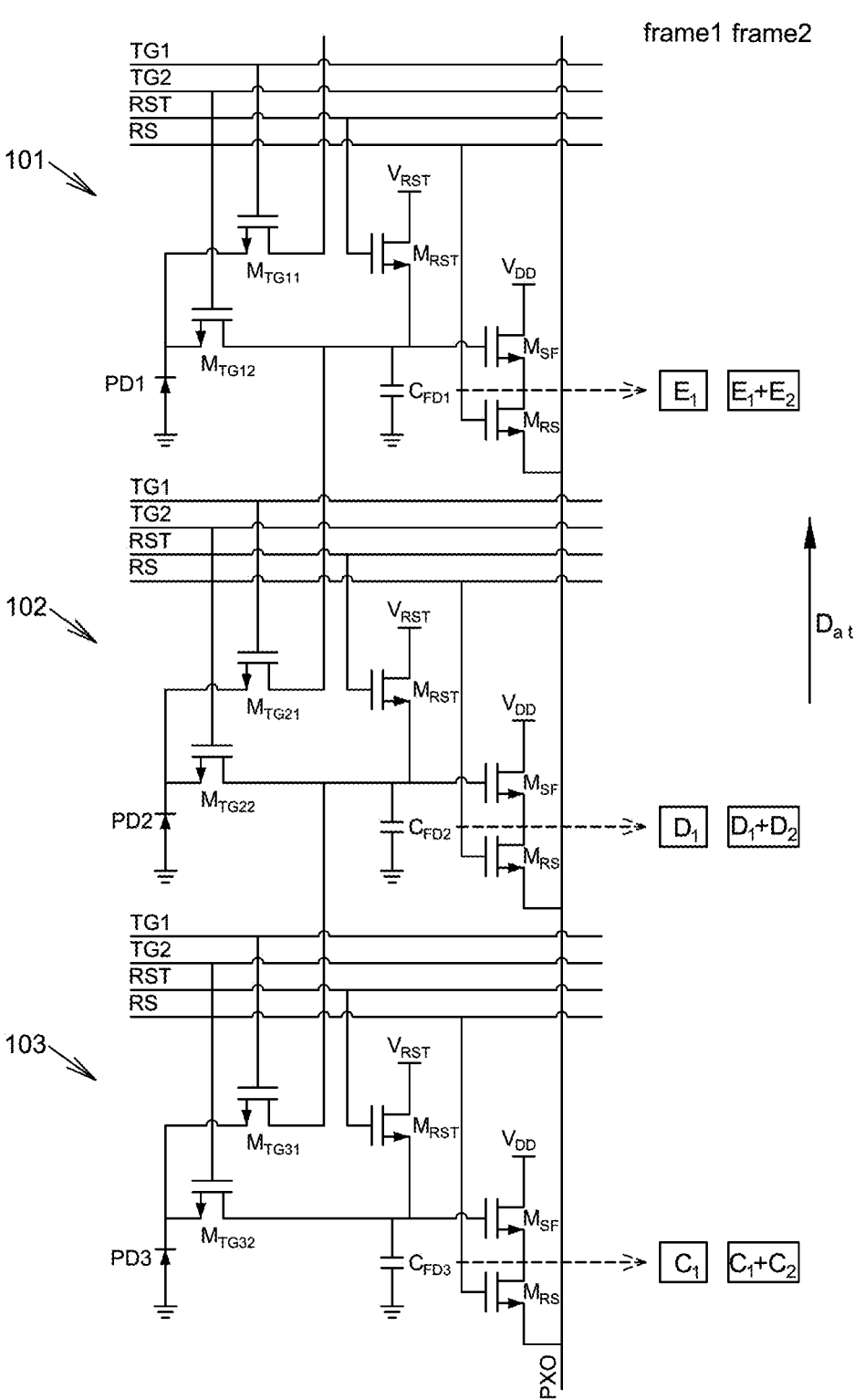
FIG. 10 is a pixel circuit of a TDI CMOS image sensor according to a third embodiment of the present disclosure.

Please refer to FIG. 10, it is a pixel circuit of a TDI CMOS image sensor (abbreviated as image sensor hereinafter) according to a third embodiment of the present disclosure. FIG. 10 shows only the pixel circuit of three pixels in one pixel column and omits other pixel circuits. The image sensor may include a pixel array shown in FIG. 2 or FIG. 5 having multiple pixels arranged in a matrix, wherein a separation space between two adjacent pixels (e.g., FIG. 2) or between two adjacent pixel groups (e.g., FIG. 5) has being illustrated above, and thus details thereof are not repeated herein. The image sensor of the third embodiment also moves with respect to a scene in an along-track direction $D_{a\_t}$, which has been illustrated above and thus details thereof are not repeated herein.

The pixel array of an image sensor of the third embodiment includes multiple pixel columns each includes multiple pixels arranged in the along-track direction Da_t. For example, the multiple pixel columns respectively include a first pixel 101 and a second pixel 102 adjacent to each other as shown in FIG. 10. Each pixel is coupled to reset voltage $V_{RST}$ and a voltage source $V_{DD}$.

The first pixel 101 includes a first photodiode PD1, a first floating diffusion node $C_{FD1}$, a first transfer transistor $M_{TG12}$, a first extra transfer transistor $M_{TG11}$, a reset transistor $M_{RST}$, a source follower transistor $M_{SF}$ and a readout transistor $M_{RS}$. The first transfer transistor $M_{TG12}$ is connected between the first photodiode PD1 and the first floating diffusion node $C_{FD1}$. The first extra transfer transistor $M_{TG11}$ is connected between the first photodiode PD1 and a floating diffusion node of another pixel adjacent to the first pixel 101, e.g., a pixel in the same pixel column as the first pixel 101 and above the first pixel 101.

The first transfer transistor $M_{TG12}$ transfers light energy detected by the first photodiode PD1 to the first floating diffusion node $C_{FD1}$ to be stored therein according to a transfer control signal TG2. The reset transistor $M_{RST}$ clears charges in the first floating diffusion node $C_{FD1}$ according to a reset signal RST. The readout transistor $M_{RS}$ reads the charges in the first floating diffusion node $C_{FD1}$ to an integrator according to a readout signal RS. The source follower transistor $M_{SF}$ is used to losslessly buffer light energy in the first floating diffusion node $C_{FD1}$ to a readout line. The image sensor includes, for example, a timing generator (not shown) to generate the signals TG1, TG2, RS and RST.

The second pixel 102 includes a second photodiode PD2, a second floating diffusion node $C_{FD2}$, a second transfer transistor $M_{TG22}$, a second extra transfer transistor $M_{TG21}$, a reset transistor $M_{RST}$, a source follower transistor $M_{SF}$ and a readout transistor $M_{RS}$. The second transfer transistor $M_{TG22}$ is connected between the second photodiode PD2 and the second floating diffusion node $C_{FD2}$. The second extra transfer transistor $M_{TG21}$ is connected between the second photodiode PD2 and the first floating diffusion node $C_{FD1}$. The arrangements of every component of the second pixel 102 are identical to those of the first pixel 101 as shown in FIG. 10, and thus details thereof are not repeated herein.

Figure 11:
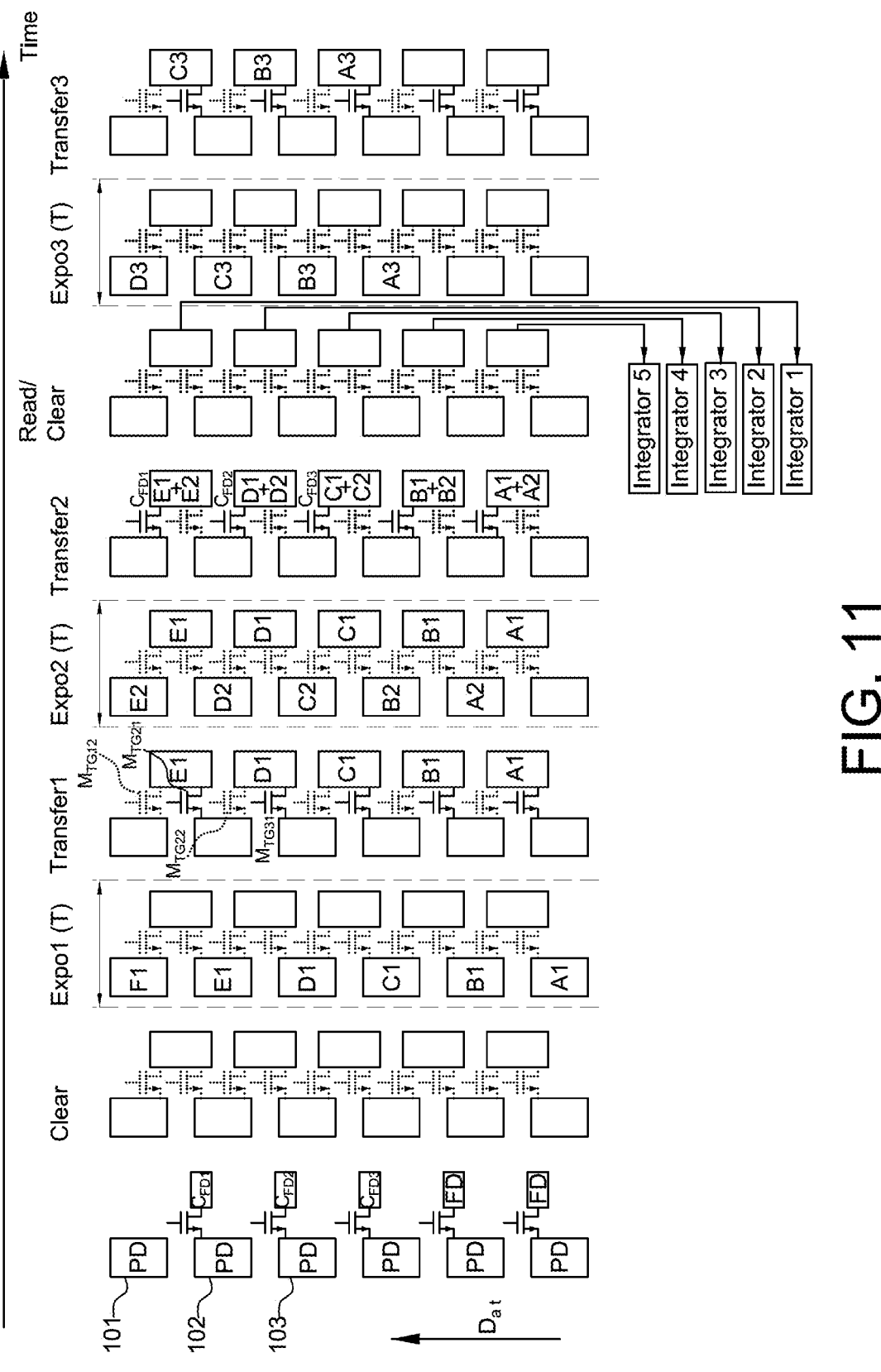
FIG. 11 is an operational schematic diagram of a TDI CMOS image sensor according to a third embodiment of the present disclosure.

Please referring to FIG. 11, it is an operational schematic diagram with time of one pixel column containing the first pixel 101 and the second pixel 102 in the pixel array of an image sensor according to a third embodiment of the present disclosure. In FIG. 11, only photodiodes (e.g., shown as PD) and floating diffusion nodes (e.g., shown as FD, including $C_{FD1}$, $C_{FD2}$ and $C_{FD3}$) of pixel circuits in one pixel column are shown and other components of the pixel circuits are omitted. In FIG. 11, the symbols A1 to F1, A2 to E2 and A3 to D3 are pixel data of every pixel associated with positions or objects contained in a scene to be detected by the image sensor. It is appreciated that a number of pixel circuits in one pixel column is not limited to six as shown in FIG. 11.

Firstly in a clear interval (e.g., shown as Clear), the timing generator generates the reset signal RST to conduct the reset transistor $M_{RST}$ to clear charges in the floating diffusion nodes, e.g., shown blank in FD and $C_{FD1}$ to $C_{FD3}$.

In a first exposure interval (e.g., shown as Expo1), the multiple photodiodes PD respectively detect pixel data A1 to F1. In a first transfer interval (e.g., shown as Transfer1), the pixel data A1 to E1 are respectively transferred/accumulated in the floating diffusion nodes FD, wherein F1 is transferred to the FD not shown in FIG. 11.

For example referring to FIGS. 10 to 12, in the first transfer interval, the first transfer transistor $M_{TG12}$ of the first pixel 101 is OFF (e.g., controlled by a signal TG2) and the second extra transfer transistor $M_{TG21}$ of the second pixel 102 is ON (e.g., controlled by a signal TG1) so as to accumulate a first pixel data E1 of the second photodiode PD2 obtained in the first exposure interval to the first floating diffusion node $C_{FD1}$, e.g., FIG. 10 showing the first pixel data E1 stored in the first floating diffusion node $C_{FD1}$ in frame 1. Meanwhile, the second transfer transistor $M_{TG22}$ of the second pixel 102 is OFF (e.g., controlled by the signal TG2) and a third extra transfer transistor $M_{TG31}$ of a third pixel 103 is ON (e.g., controlled by the signal TG1) so as to accumulate a first pixel data D1 of the third photodiode PD3 obtained in the first exposure interval to the second floating diffusion node $C_{FD2}$, e.g., FIG. 10 showing the second pixel data D1 stored in the second floating diffusion node $C_{FD2}$ in frame 1. The third floating diffusion node $C_{FD3}$ stores a first pixel data C1.

For example, in the second transfer interval (e.g., shown as Transfer2), the first transfer transistor $M_{TG12}$ of the first pixel 101 is ON and the second extra transfer transistor $M_{TG21}$ of the second pixel 102 is OFF so as to accumulate a second pixel data E2 of the first photodiode PD1 obtained in the second exposure interval (e.g., shown as Expo2) to the first floating diffusion node $C_{FD1}$, e.g., FIG. 10 showing the first pixel data E1 and the second pixel data E2 (e.g., shown as E1+E2) stored in the first floating diffusion node $C_{FD1}$ in frame 2. Meanwhile, the first transfer transistor $M_{TG22}$ of the second pixel 102 is ON and the third extra transfer transistor $M_{TG31}$ of the third pixel 103 is OFF so as to accumulate a second pixel data D2 of the second photodiode PD2 obtained in the second exposure interval to the second floating diffusion node $C_{FD2}$, e.g., FIG. 10 showing the first pixel data D1 and the second pixel data D2 (e.g., shown as D1+D2) stored in the second floating diffusion node $C_{FD2}$ in frame 2. Pixel data accumulated in other floating diffusion nodes of other pixels are shown in FIG. 11. In FIG. 11, transistor switches shown in solid lines indicate ON states, and transistor switches shown in dashed lines indicate OFF states.

In this embodiment, the first transfer interval is behind the first exposure interval, the second exposure interval is behind the first transfer interval, and the second transfer interval is behind the second exposure interval. The first exposure interval and the second exposure interval are, for example, identical to the frame period T mentioned above.

Figure 1:
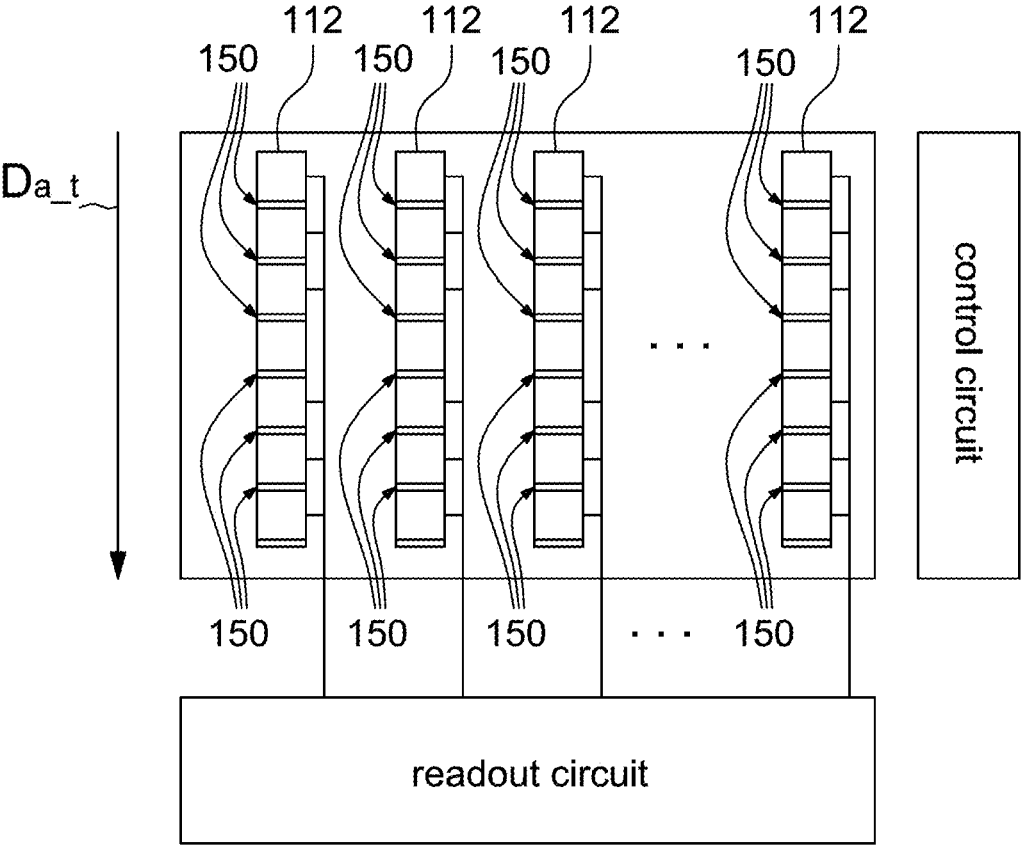
FIG. 1 is a schematic diagram of a CMOS image sensor for time delay integration (TDI) imaging.

Within the readout interval (e.g., shown as Read in FIG. 11), a readout circuit (e.g., shown in FIGS. 1, 2 and 5) reads pixel data in the floating diffusion nodes and sends the read pixel data to the integrators. Then, charges in the floating diffusion nodes are cleared (e.g., shown as blank) by conducting the reset transistors $M_{RST}$. For example, the integrator 1 receives pixel data E1+E2, the integrator 2 receives pixel data D1+D2, the integrator 3 receives pixel data C1+C2, the integrator 4 receives pixel data B1+B2, and the integrator 5 receives pixel data A1+A2. As mentioned above, the accumulated data is determined according to the along-track direction Da_t.

In the aspect that includes two pixel rows (stages), the pixel data accumulated in the integrators 1 to 5 have been accumulated for two times. However, in the aspect having four pixel rows, six pixel rows or more pixel rows (preferably multiple of 2), the floating diffusion nodes firstly accumulate two times of TDI pixel data in pixels before being readout, and then the readout circuit reads the TDI pixel data to the integrators to be further integrated therein.

In the third embodiment, the transfer transistor and the extra transfer transistor in the same pixel are not conducted in the same frame period, e.g., as shown in FIGS. 11 and 12. Meanwhile, there is no readout interval between the first transfer interval (e.g., Transfer1) and the second transfer interval (e.g., Transfer 2) so as to reduce a number of times and intervals to read the pixel array by the readout circuit. That is, a total readout time is reduced to ½.

Figure 13:
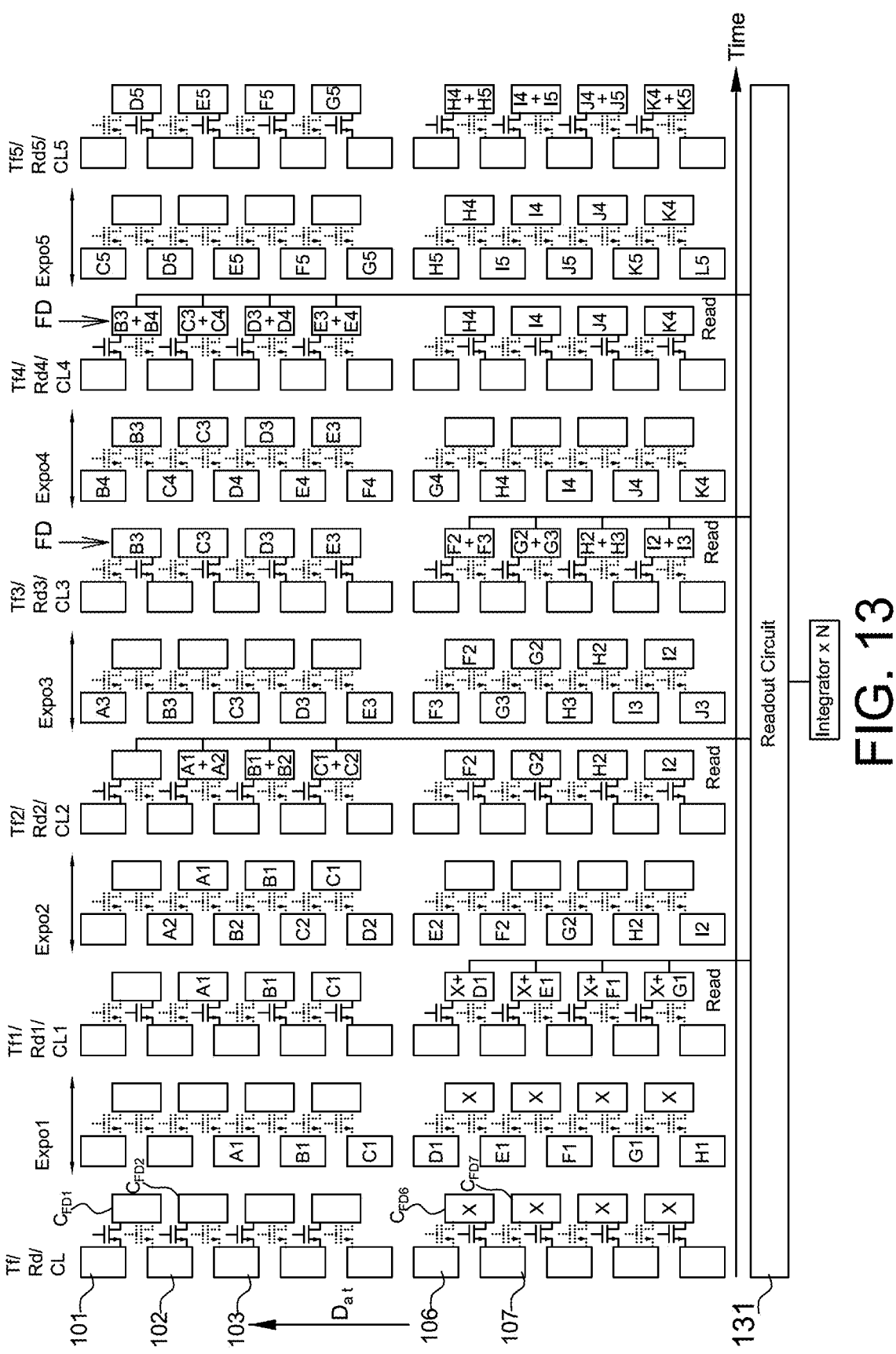
FIG. 13 is another operational schematic diagram of a TDI CMOS image sensor according to a third embodiment of the present disclosure.

Please refer to FIG. 13, it is an operational schematic diagram of the image sensor 200 in FIG. 2 adopting the pixel arrangement in the third embodiment as shown in FIG. 10, i.e. adding an extra transfer transistor. In addition to operations of the first pixel 101 and the second pixel 102 in FIG. 11, the pixel column contains the first pixel 101 and the second pixel 102 also includes a third pixel 106 and a fourth pixel 107 adjacent to each other. Pixel structures of the third pixel 106 and the fourth pixel 107 are respectively identical to those of the first pixel 101 and the second pixel 102. As shown in FIG. 13, a first readout interval (e.g., shown as Rd2) of the first pixel 101 and the second pixel 102 is different from a second readout interval (e.g., shown as Rd3) of the third pixel 106 and the fourth pixel 107. In one aspect, the first readout interval and the second readout interval are arranged alternatively. In this way, because only a half pixel rows (e.g., upper half or lower half) is read in each readout interval, a total interval required to read pixel data of the pixel array is reduced. That is in FIG. 13, the upper pixel rows and the lower pixel rows have identical operations as that described in FIG. 11, only there is a time difference of one frame period therebetween in reading pixel data.

As shown in FIG. 13, pixel data accumulated to the same integrator are from image frames separated by one image frame instead of from two adjacent image frames, e.g., pixel data associated with a position B of the scene is read in a readout interval Rd2 (e.g., shown as B1+B2) and a readout interval Rd4 (e.g., shown as B3+B4), and pixel data associated with a position H of the scene is read in a readout interval Rd3 (e.g., shown as H2+H3) and a readout interval Rd5 (e.g., shown as H4+H5). The readout circuit 131 accumulates the read pixel data to the same or different integrators according to predetermined control signals, i.e. pixel data associated with the same position of a scene being accumulated to the same integrator. The readout circuit 131 further controls an accumulated times of the pixel data. The symbol "X" shown in FIG. 13 indicates pixel data.

Figure 14:
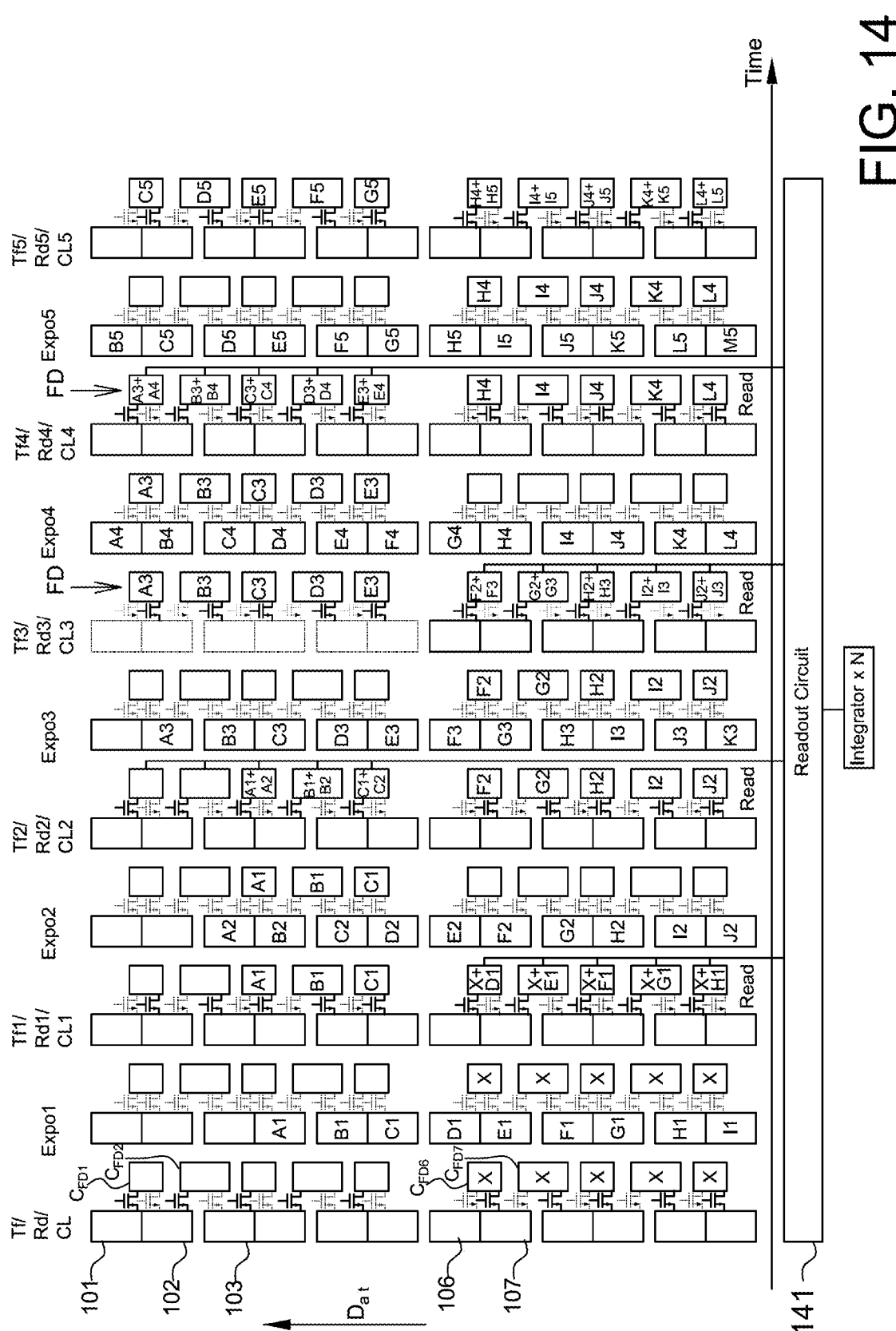
FIG. 14 is a further operational schematic diagram of a TDI CMOS image sensor according to a third embodiment of the present disclosure.

Please refer to FIG. 14, it is as operational schematic diagram of the image sensor 500 in FIG. 5 adopting the pixel arrangement in the third embodiment as shown in FIG. 10, i.e. adding an extra transfer transistor. The operating method of an image sensor of the third embodiment is shown in FIGS. 13 and 14, and includes the following steps (described using FIG. 14 as an example): exposing a first pixel row (e.g., pixel row containing the first pixel 101) and a second pixel row (e.g., pixel row containing the second pixel 102) in a first exposure interval (e.g., shown as Expo3); transferring a first pixel data (e.g., shown as A3 to E3) of the second pixel row to a floating diffusion node FD of each pixel of the first pixel row in a first transfer interval (e.g., shown as Tf3); exposing the first pixel row and the second pixel row in a second exposure interval (e.g., shown as Expo4); and transferring a second pixel data (e.g., shown as A4 to E4) of the first pixel row to the floating diffusion node FD of the each pixel of the first pixel row in a second transfer interval (e.g., shown as Tf4), wherein the first pixel data and the second pixel data are pixel data associated with a same position of the scene. As shown in FIG. 14, in the Tf4, the first floating diffusion node stores pixel data A3+A4; the second floating diffusion node stores pixel data B3+B4; and so on. The charges in the floating diffusion node are cleared after the clear interval (e.g., shown as CL4), and thus there is no data in the floating diffusion nodes in Expo5. In FIGS. 13 and 14, the charges are firstly transferred to the floating diffusion nodes to be read, the charges in the floating diffusion nodes are cleared after being read.

Because there is no readout interval to read the first pixel rows and the second pixel rows between the first transfer interval and the second transfer interval, e.g., no readout interval between Tf3 and Tf4 (only lower half of pixel rows being read), a total interval for reading pixel data by the readout circuit is reduced. The readout circuit reads the accumulated pixel data to a first integrator in a first readout interval (e.g., Rd4). As mentioned above, a number of integrators is determined according to a number of stages of the pixel array.

The above operating method describes the operation of a part of pixel array (e.g., upper half pixel rows), and the other part of pixel array (e.g., lower half pixel rows) includes the steps of: exposing a third pixel row (e.g., pixel row containing a third pixel 106) and a fourth pixel row (e.g., pixel row containing a fourth pixel 107) in the first exposure interval (e.g., shown as Expo3); transferring a third pixel data (e.g., shown as F3 to J3) of the third pixel row to a floating diffusion node FD of each pixel of the third pixel row in the first transfer interval (e.g., shown as Tf3); exposing the third pixel row and the fourth pixel row in a third exposure interval (e.g., shown as Expo2); and transferring a fourth pixel data (e.g., shown as F2 to J2) of the fourth pixel row to the floating diffusion node FD of the each pixel of the third pixel row in a third transfer interval (e.g., shown as Tf2), wherein the third pixel data and the fourth pixel data are pixel data corresponding to another same position of the scene. As shown in FIG. 14, the accumulated pixel data in the floating diffusion nodes FD of every pixel of the third pixel row and the fourth pixel row is not readout in a third readout interval (e.g., shown as Rd2) so as to further perform the in-pixel TDI. The readout circuit 141 reads the accumulated pixel data in the third pixel row and the fourth pixel row to a second integrator in a second readout interval (e.g., Rd3).

As shown in FIG. 14, pixel data accumulated to the same integrator are from image frames separated by one image frame instead of from two adjacent image frames, e.g., pixel data associated with a position B of the scene is read in a readout interval Rd2 (e.g., shown as B1+B2) and a readout interval Rd4 (e.g., shown as B3+B4), and pixel data associated with a position H of the scene is read in a readout interval Rd3 (e.g., shown as H2+H3) and a readout interval Rd5 (e.g., shown as H4+H5). The readout circuit 141 accumulates the read pixel data to the same or different integrators according to predetermined control signals, i.e. pixel data associated with the same position of a scene being accumulated to the same integrator. The readout circuit 141 further controls an accumulated times of the pixel data. The symbol "X" shown in FIG. 14 indicates pixel data.

As shown in FIG. 14, the first readout interval and the second readout interval are arranged alternatively so as to read a half pixel rows in each readout interval to reduce a total interval for reading pixel data.

Figure 15:
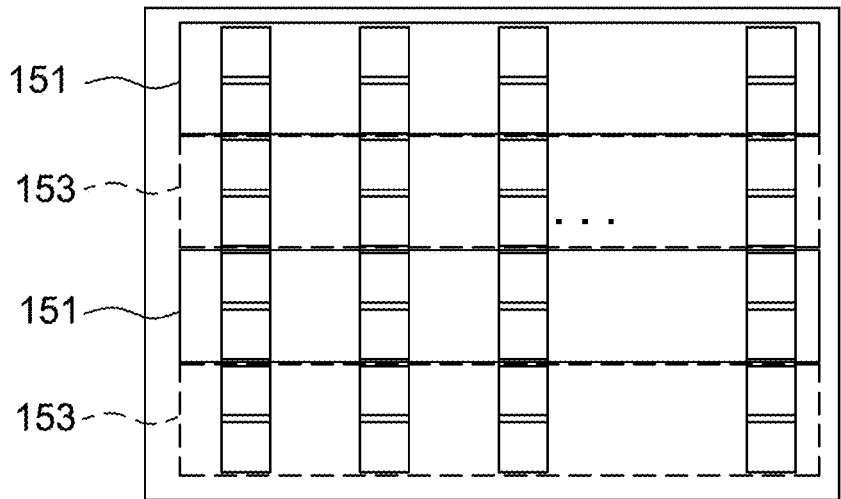
FIG. 15 is a schematic diagram of an operation division of a pixel array of a TDI CMOS image sensor according to a third embodiment of the present disclosure.

It should be mentioned that although FIGS. 13 and 14 divide the operations of the pixel array into an upper part and a lower part, the present disclosure is not limited thereto. Please refer to FIG. 15, in other aspects, a pixel array 150 (or pixel array shown in FIG. 5) is divided into multiple first pixel regions 151 and multiple pixel regions 153, wherein operations of pixels in the first pixel regions 151 are identical to the operations of the pixel row containing the first pixel 101 and the second pixel 102 shown in FIGS. 13-14; and operations of pixels in the second pixel regions 153 are identical to the operations of the pixel row containing the third pixel 106 and the fourth pixel 107 shown in FIGS. 13-14. It is appreciated that the division of the pixel regions is not limited to that shown in FIG. 15.

It should be mentioned that although the in-pixel TDI of the present disclosure is described by taking a rolling shutter as an example, the present disclosure is not limited thereto. The global shutter pixel array (e.g., no separation between pixel rows) is also adaptable to the operation of in-pixel TDI of the present disclosure.

It should be mentioned that although the drawings of the present disclosure are shown with a capacitor formed by a single PN junction as a floating diffusion node, the present disclosure is not limited thereto. In other aspects, each pixel is arranged with two parallel capacitors, one of which is connected to the transfer transistor thereof and the other one is connected to the transfer transistor of an adjacent pixel.

It should be mentioned that although the present disclosure is described in the way that the first floating diffusion node $C_{FD1}$ is arranged in the first pixel 101 and the second floating diffusion node $C_{FD2}$ is arranged in the second pixel 102, the present disclosure is not limited thereto. In other aspects, the first floating diffusion node $C_{FD1}$ is arranged between the first pixel 101 and the second pixel 102, the second floating diffusion node $C_{FD2}$ is arranged between the second pixel 102 and the third pixel 103, and so on.

It is appreciated that values, e.g., including a number of pixels, integrators and image frames, in every embodiment and drawing of the present disclosure are only intended to illustrate but not to limit the present disclosure.

As mentioned above, when the CMOS image sensor adopting rolling shutter technique is applied to TDI imaging, the integrated pixel data is not exactly corresponding to the same position or object in a scene to generate distortion because the exposure of all pixels of a pixel array is not started and ended at the same time. Accordingly, the present disclosure further provides a TDI CMOS image sensor using a rolling shutter (e.g., FIGS. 2 and 5) and an operating method thereof (e.g., FIGS. 3, 4A and 6) that compensate the line time difference of a rolling shutter, which causes distortion, by arranging different pixel separation spaces. By arranging the control signal of a control circuit correspondingly, pixel data of corresponding position is integrated to the associated integrator correctly.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time delay integration (TDI) image sensor, configured to move with respect to a scene in an along-track direction, the image sensor comprising:

a pixel array, comprising multiple pixel columns, each of the multiple pixel columns comprising multiple pixels arranged in the along-track direction, and the multiple pixel columns respectively comprising a first pixel and a second pixel adjacent to each other, the first pixel comprising:

a first photodiode;

a first floating diffusion node; and a first transfer transistor, connected between the first photodiode and the first floating diffusion node; and the second pixel comprising:

a second photodiode;

a second floating diffusion node;

a second transfer transistor, connected between the second photodiode and the second floating diffusion node; and a second extra transfer transistor, connected between the second photodiode and the first floating diffusion node, wherein a first pixel data of the second photodiode obtained in a first exposure interval is accumulated in the first floating diffusion node in a first transfer interval, a second pixel data of the first photodiode obtained in a second exposure interval is accumulated in the first floating diffusion node in a second transfer interval, and the first transfer interval is behind the first exposure interval, the second exposure interval is behind the first transfer interval, and the second transfer interval is behind the second exposure interval.

2. The image sensor as claimed in claim 1, wherein the second transfer transistor and the second extra transfer transistor are not conducted within the same image frame.

3. The image sensor as claimed in claim 1, wherein the first pixel further comprises a first extra transfer transistor connected between the first photodiode and a floating diffusion node of another pixel adjacent to the first pixel.

4. The image sensor as claimed in claim 1, wherein there is no readout interval between the first transfer interval and the second transfer interval.

5. The image sensor as claimed in claim 1, further comprising a third pixel and a fourth pixel adjacent to each other and in the same pixel column as the first pixel and the second pixel, wherein a first readout interval of the first and second pixels is different from a second readout interval of the third and fourth pixels.

6. The image sensor as claimed in claim 5, wherein the first readout interval and the second readout interval are arranged alternatively.

7. The image sensor as claimed in claim 1, wherein two adjacent pixels of each of the multiple pixel columns have a separation space to compensate a line time difference of using a rolling shutter.

8. The image sensor as claimed in claim 7, wherein the separation space is a multiplication of a pixel height in the along-track direction by a time ratio of the line time difference of the rolling shutter and a frame period of capturing an image frame.

9. The image sensor as claimed in claim 7, the separation space is a summation of a pixel height in the along-track direction and a multiplication of the pixel height by a time ratio of the line time difference of the rolling shutter and a frame period of capturing an image frame.

10. The image sensor as claimed in claim 1, wherein two adjacent pixel groups of the multiple pixels have a separation space therebetween to compensate a line time difference of using a rolling shutter, and each of the pixel groups comprises the first pixel and the second pixel.

11. An operating method of a TDI image sensor, the TDI image sensor moving with respect to a scene in an along-track direction and comprising a first pixel row and a second pixel row, the operating method comprising:

exposing the first pixel row and the second pixel row in a first exposure interval;

transferring a first pixel data of the second pixel row to a floating diffusion node of each pixel of the first pixel row in a first transfer interval;

exposing the first pixel row and the second pixel row in a second exposure interval; and transferring a second pixel data of the first pixel row to the floating diffusion node of the each pixel of the first pixel row in a second transfer interval, wherein the first pixel data and the second pixel data are pixel data corresponding to a same position of the scene.

12. The operating method as claimed in claim 11, wherein there is no readout interval between the first transfer interval and the second transfer interval of the first and second pixel rows.

13. The operating method as claimed in claim 11, further comprising:

reading the first pixel data and the second pixel data accumulated in the floating diffusion node in a first readout interval.

14. The operating method as claimed in claim 13, wherein the image sensor further comprises a third pixel row and a fourth pixel row arranged in the along-track direction with the first pixel row and the second pixel row, and the operating method further comprises:

exposing the third pixel row and the fourth pixel row in the first exposure interval;

transferring a third pixel data of the third pixel row to a floating diffusion node of each pixel of the third pixel row in the first transfer interval;

exposing the third pixel row and the fourth pixel row in a third exposure interval; and transferring a fourth pixel data of the fourth pixel row to the floating diffusion node of the each pixel of the third pixel row in a third transfer interval, wherein the third pixel data and the fourth pixel data are pixel data corresponding to another same position of the scene, and accumulated pixel data in the floating diffusion node of the each pixel of the third pixel row is not readout in a third readout interval.

15. The operating method as claimed in claim 14, further comprising:

reading the accumulated pixel data in the floating diffusion node of the each pixel of the third pixel row in a second readout interval.

16. The operating method as claimed in claim 15, wherein the first readout interval and the second readout interval are arranged alternatively.

17. The operating method as claimed in claim 15, wherein the image sensor further comprises a readout circuit, and the operating method further comprising:

accumulating pixel data readout in the first readout interval by the readout circuit to a first accumulator; and accumulating pixel data readout in the second readout interval by the readout circuit to a second accumulator.

18. The operating method as claimed in claim 11, wherein two adjacent pixels of each pixel column of the image sensor have a separation space to compensate a line time difference of using a rolling shutter.

19. The operating method as claimed in claim 18, wherein the separation space is a multiplication of a pixel height in the along-track direction by a time ratio of the line time difference of the rolling shutter and a frame period of capturing an image frame, or a summation of a pixel height in the along-track direction and a multiplication of the pixel height by a time ratio of the line time difference of the rolling shutter and a frame period of capturing an image frame.

* * * * *